(12) United States Patent
Naito

(10) Patent No.: US 10,873,674 B2
(45) Date of Patent: Dec. 22, 2020

(54) COMMUNICATION APPARATUS CAPABLE OF REMOTE SETTING BY VOICE COMMUNICATION, CONTROL METHOD, AND PROGRAM

(71) Applicant: CANON KABUSHIKI KAISHA, Tokyo (JP)

(72) Inventor: Yosui Naito, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/561,881

(22) Filed: Sep. 5, 2019

(65) Prior Publication Data
US 2020/0084324 A1 Mar. 12, 2020

(30) Foreign Application Priority Data
Sep. 11, 2018 (JP) .................. 2018-170080

(51) Int. Cl.
H04N 1/00 (2006.01)
H04N 1/44 (2006.01)
H04N 1/327 (2006.01)
G06F 3/12 (2006.01)
G06Q 20/32 (2012.01)

(52) U.S. Cl.
CPC ....... H04N 1/00403 (2013.01); G06F 3/1205 (2013.01); G06F 3/1253 (2013.01); G06F 3/1285 (2013.01); H04N 1/00392 (2013.01); H04N 1/32723 (2013.01); H04N 1/32726 (2013.01); H04N 1/4413 (2013.01); G06Q 20/3272 (2013.01)

(58) Field of Classification Search
None
See application file for complete search history.

(56) References Cited

U.S. PATENT DOCUMENTS

| 5,727,050 A | * | 3/1998 | Mori | H04N 1/324 379/100.09 |
| 6,243,682 B1 | * | 6/2001 | Eghtesadi | G03G 15/5016 704/270 |
| 2002/0063882 A1 | * | 5/2002 | Sekiguchi | H04N 1/00212 358/1.15 |
| 2006/0116884 A1 | * | 6/2006 | Itaki | G10L 13/00 704/271 |

FOREIGN PATENT DOCUMENTS

JP H07-58832 A 3/1995

* cited by examiner

Primary Examiner — Miya J Williams
(74) Attorney, Agent, or Firm — Canon U.S.A., Inc., IP Division

(57) ABSTRACT

A communication apparatus is provided and includes a display configured to display information and at least one controller configured to cause the display to display a PIN code set in the communication apparatus; and output a guidance voice regarding a remote setting change using a tone signal to an external apparatus via voice communication depending on reception of a tone signal corresponding to the PIN code from the external apparatus via voice communication.

20 Claims, 26 Drawing Sheets

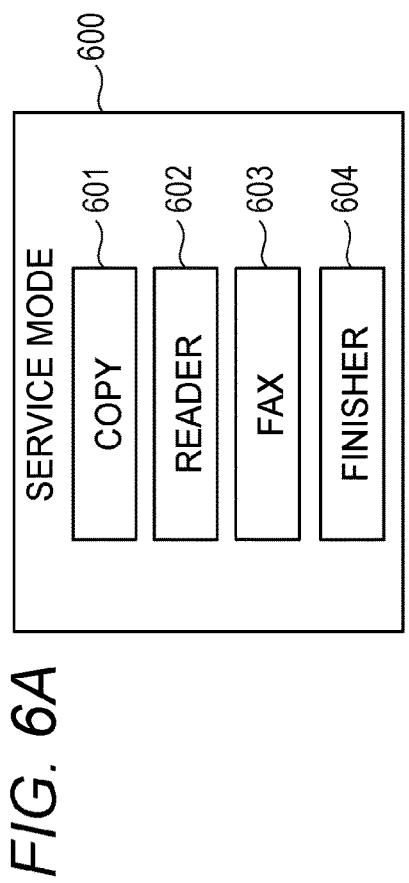

| ITEM NAME | | | | TYPE (701) | MINIMUM VALUE (702) | MAXIMUM VALUE (703) |
|---|---|---|---|---|---|---|
| 10000 COPIER | | | | | | |
| | Display | | | MENU | – | – |
| | | USER | | MENU | – | – |
| | | | 01 | num | 0 | 9999 |
| | | | ... | ... | ... | ... |
| | | ACC-STS | | MENU | – | – |
| | | | 01 | num | 0 | 9999 |
| | | | ... | ... | ... | ... |
| | I/O | | | MENU | – | – |
| | | ... | | ... | ... | ... |
| | Adjust | | | MENU | – | – |
| | | ... | | ... | ... | ... |
| | ... | | | ... | ... | ... |

| FIG. 7A |
| FIG. 7B |
| FIG. 7C |
| FIG. 7D |
| FIG. 7E |

FIG. 7D

FROM FIG. 7C

| | | | | |
|---|---|---|---|---|
| 34500 Special Numeric | | MENU | - | - |
| | 01 | num | 0 | 9999 |
| | 02 | num | 0 | 99 |
| | 03 | num | 0 | 9999 |
| | ... | ... | ... | ... |
| 35000 TYPE | | num | 0 | 50 |
| 36000 IPFAX | | MENU | - | - |
| 36100 BASIC Bit SW | | MENU | - | - |
| | SW 01 | bit | - | - |
| | SW 02 | bit | - | - |
| | SW 03 | bit | - | - |
| | ... | ... | ... | ... |
| 36200 BASIC Numeric | | MENU | - | - |
| | 01 | num | 5 | 9999 |
| | 02 | num | 0 | 9999 |
| | 03 | num | 0 | 50 |
| | ... | ... | ... | ... |
| 36300 NetworkA Bit SW | | MENU | - | - |
| | SW 01 | bit | - | - |
| | SW 02 | bit | - | - |
| | SW 03 | bit | - | - |
| | ... | ... | ... | ... |

```
10000 : COPIER
20000 : READER
30000 : FAX
31000 : Sssw
32000 : Menu
33000 : Num
34000 : Ncu
34100 : TONE
34200 : PULSE
34300 : DIALTONE
34400 : SPECIALB
34500 : SPECIALN
35000 : Type
36000 : IPFAX
36100 : BASIC B
36200 : BASIC N
36300 : NWA B
36400 : NWA N
40000 : FINISHER
```
~ 800

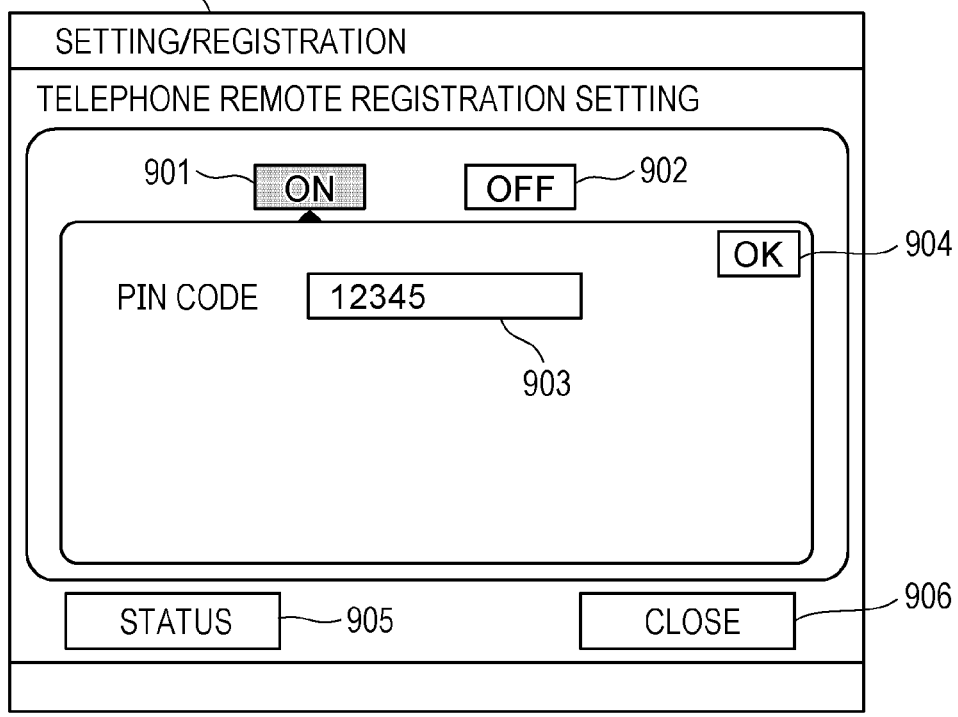
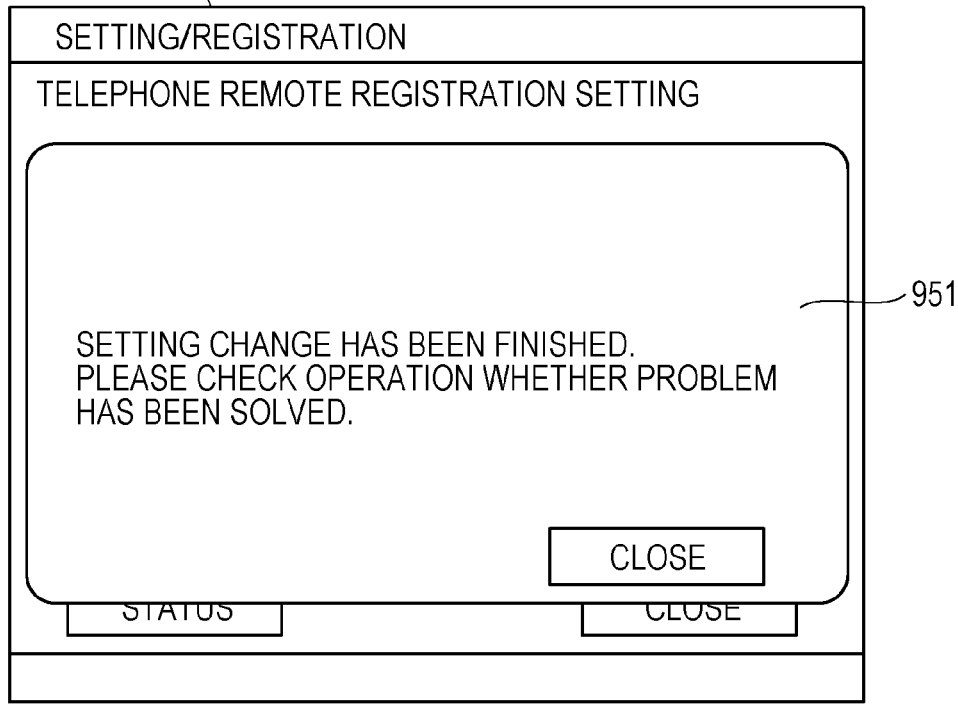

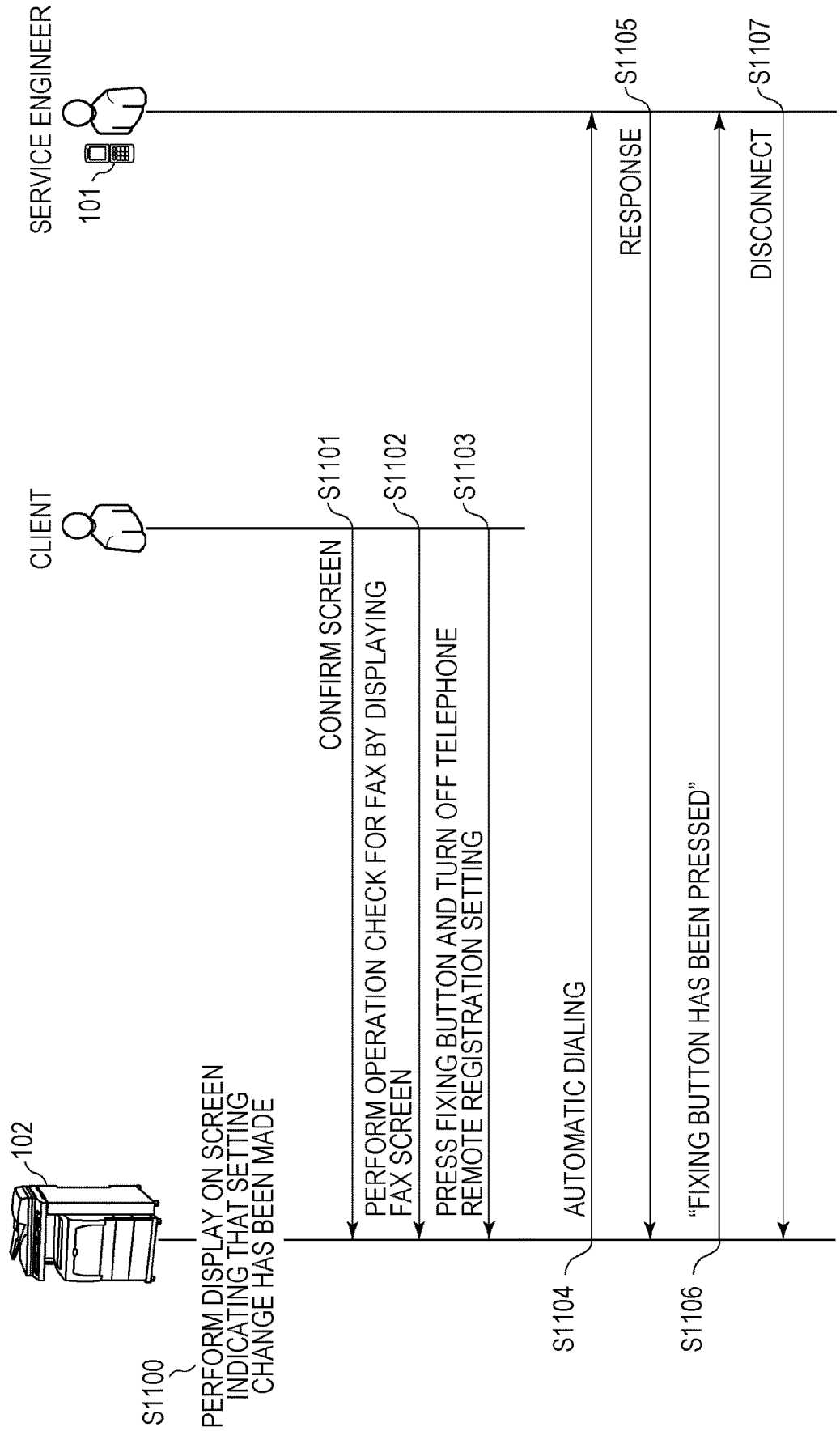

| TARGET FUNCTION | UI REGISTRATION MENU START POSITION |
|---|---|
| G3FAX | 30000 FAX |
| IPFAX | 36000 IPFAX |

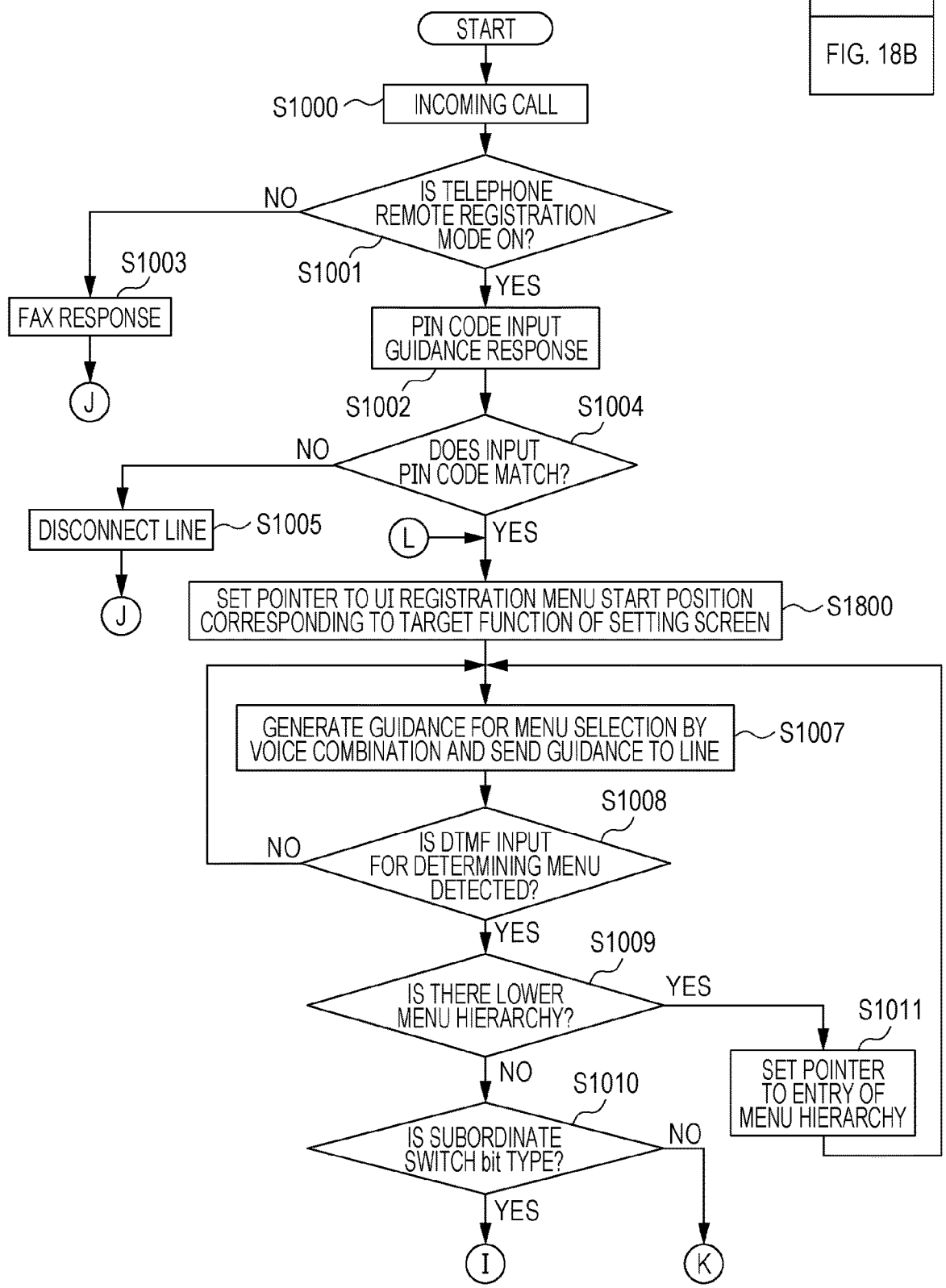

FIG. 19

1900 PLEASE INPUT PIN CODE FOR PERFORMING TELEPHONE REMOTE REGISTRATION.
1901 TELEPHONE REMOTE REGISTRATION STARTS.
1902 WHEN MENU TO BE CHANGED IS
1903 @1, @2
1904 PLEASE INPUT.
1905 SELECTED MENU IS @1. PLEASE INPUT NUMBER OF SWITCH TO BE CHANGED.
1906 SELECTED SWITCH IS @1. PLEASE INPUT BIT NUMBER TO BE CHANGED. NOTE THAT BIT NUMBER STARTS WITH 0.
1907 BIT @2 OF SWITCH @1 IS CURRENTLY @3. PLEASE INPUT VALUE TO BE CHANGED.
1908 BIT @2 OF SWITCH @1 IS CHANGED TO @3. IF YOU REDO, PLEASE INPUT 1. IF OK, PLEASE INPUT 2.
1909 SWITCH @1 IS CURRENTLY @1. PLEASE INPUT VALUE TO BE CHANGED.
1910 SWITCH @1 IS CHANGED TO @2. IF YOU REDO, PLEASE INPUT 1. IF OK, PLEASE INPUT 2.
1911 SELECTED MENU IS @1. IF SWITCH TO BE CHANGED IS BIT SWITCH, PLEASE INPUT 1. IN CASE OF NUMERICAL VALUE SWITCH, PLEASE INPUT 2.
1912 SWITCH TO BE CHANGED IS BIT SWITCH. PLEASE INPUT BIT NUMBER TO BE CHANGED. NOTE THAT BIT NUMBER STARTS WITH 0.
1913 SWITCH TO BE CHANGED IS NUMERICAL VALUE SWITCH. PLEASE INPUT NUMBER OF SWITCH TO BE CHANGED.
1914 IF YOU RETURN TO TOP AND CONTINUE TO CHANGE ANOTHER SWITCH, PLEASE INPUT 1. IF YOU END OPERATION, PLEASE INPUT 2 OR DISCONNECT PHONE CALL.

COMMUNICATION APPARATUS CAPABLE OF REMOTE SETTING BY VOICE COMMUNICATION, CONTROL METHOD, AND PROGRAM

BACKGROUND

Field

The present disclosure relates to a communication apparatus including a phone call function and a system including the same. The communication apparatus is used as an apparatus such as a telephone, a FAX, or an MFP (Multi-function Peripheral).

Description of the Related Art

Conventionally, communication apparatuses such as FAX have been known as an apparatus connected to a public line used for phone call. Recently such communication apparatuses include various functions, and numerous setting items and adjustment items are present. Moreover, among such items include numerous items that require expert knowledge. Therefore, in many cases, setting of the items is performed by a service engineer instead of a general user. The service engineer visits a site where the apparatus is installed or establishes a remote connection to the apparatus to perform setting of the items related to the apparatus.

Japanese Patent Laid-Open No. 7-58832 describes a technology of changing a setting of a communication apparatus using a telephone line. Moreover, the communication apparatus transmits a response message to a communication destination apparatus in receiving a setting change command.

Moreover, a technology has been widely known in which such a response message is used as voice guidance and a user of a communication destination apparatus is urged to perform operation of inputting information corresponding to the voice guidance.

However, a remote setting function by means of such voice guidance does not reflect an intention of the user of the communication apparatus. Accordingly, there is a possibility that voice guidance for a content not intended by the user of the communication apparatus is given and remote setting of an unintended content is performed.

SUMMARY

Provided is a communication apparatus including a remote setting function that is highly convenient for a user. In particular, the present disclosure provides a communication apparatus in which a change of a setting content intended by a user is performed by voice guidance intended by the user.

The present disclosure is also directed to providing a communication apparatus including: a display configured to display information; at least one controller configured to: cause the display to display a PIN code set in the communication apparatus; and output a guidance voice regarding a remote setting change using a tone signal to an external apparatus via voice communication depending on reception of a tone signal corresponding to the PIN code from the external apparatus via voice communication.

Further features will become apparent from the following description of exemplary embodiments (with reference to the attached drawings).

BRIEF DESCRIPTION OF THE DRAWINGS

FIG. 6A is a view illustrating a service setting screen A.
FIG. 6B is a view illustrating a service setting screen B.
FIG. 6C is a view illustrating a service setting screen C.
FIGS. 7A to 7E are diagrams illustrating a menu hierarchical structure of service setting.
FIG. 8 is a diagram illustrating a menu message list of a service setting screen.
FIG. 9A is a view illustrating a setting screen of telephone remote setting.
FIG. 9B is a view illustrating a completion screen of telephone remote setting processing.
FIG. 11 is a diagram illustrating a sequence during use of a system according to Example 2.
FIGS. 18A and 18B depict a flowchart in the case of performing telephone remote setting of Example 3.
FIG. 19 is a diagram illustrating a message list of a fixed part used for generation of voice guidance.

DESCRIPTION OF THE EMBODIMENTS

An embodiment of the present disclosure is described in detail below in conjunction with examples and the drawings. Note that the scope of the present disclosure is not limited to the configuration described in the examples. A part or whole of the configuration may be replaced with an equivalent as far as the same effect as the target effect can be obtained.

Example 1

In Example 1, a description is given of the present disclosure by way of an example in which a remote setting change by a telephone 101 via a public network (PSTN) 103 is performed to update a registered value of the MFP 102. Note that a description of an entire system is followed by a detailed description of each configuration.

<System Configuration>

Figure 1:
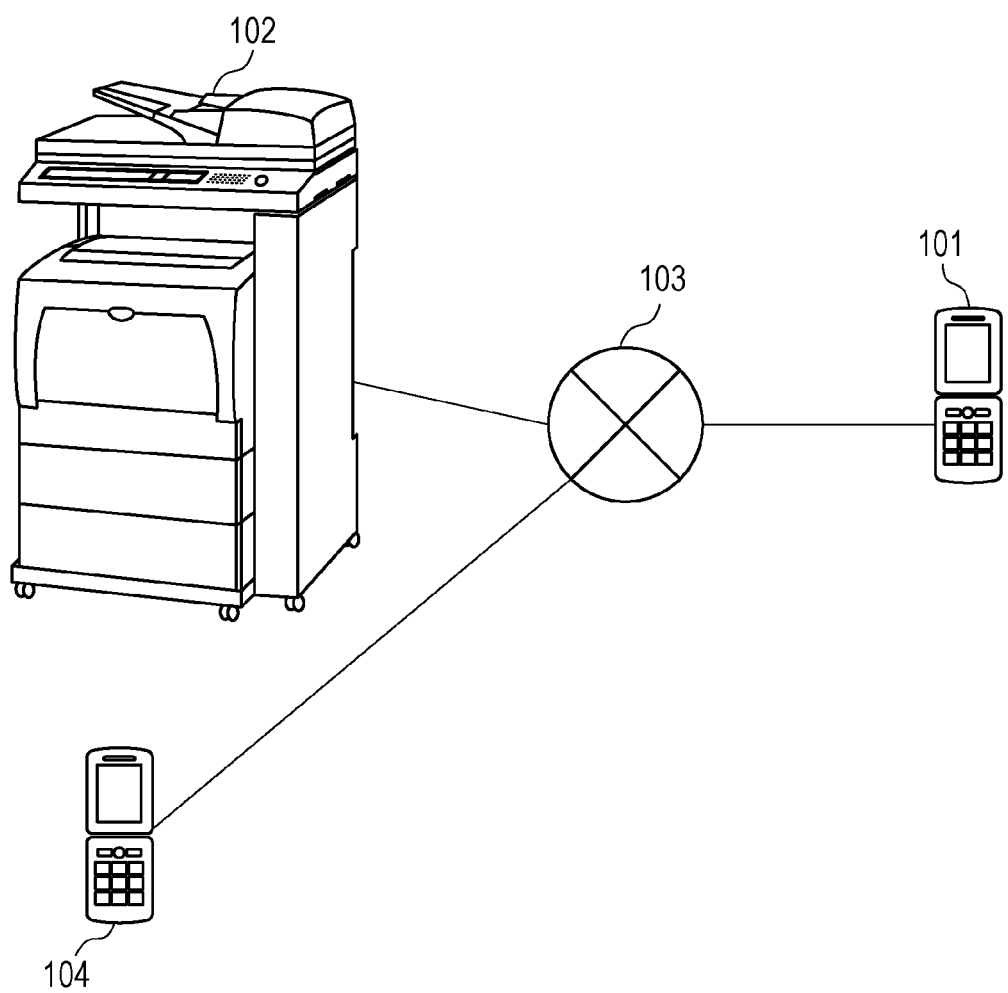
FIG. 1 is a diagram illustrating a configuration of a communication system.

FIG. 1 is a diagram illustrating a configuration of a communication system. In FIG. 1, a telephone (101, 104) and the MFP 102 are connected to the public network (PSTN) 103 that performs voice communication and can be communicated with each other. Here, the telephone 101 is used by a service engineer positioned at a remote place with respect to the MFP 102, and the telephone 104 is used by a user of the MFP 102. The telephone 101 functions as an external apparatus with respect to the MFP 102.

<Use Case of System>

Figure 2:
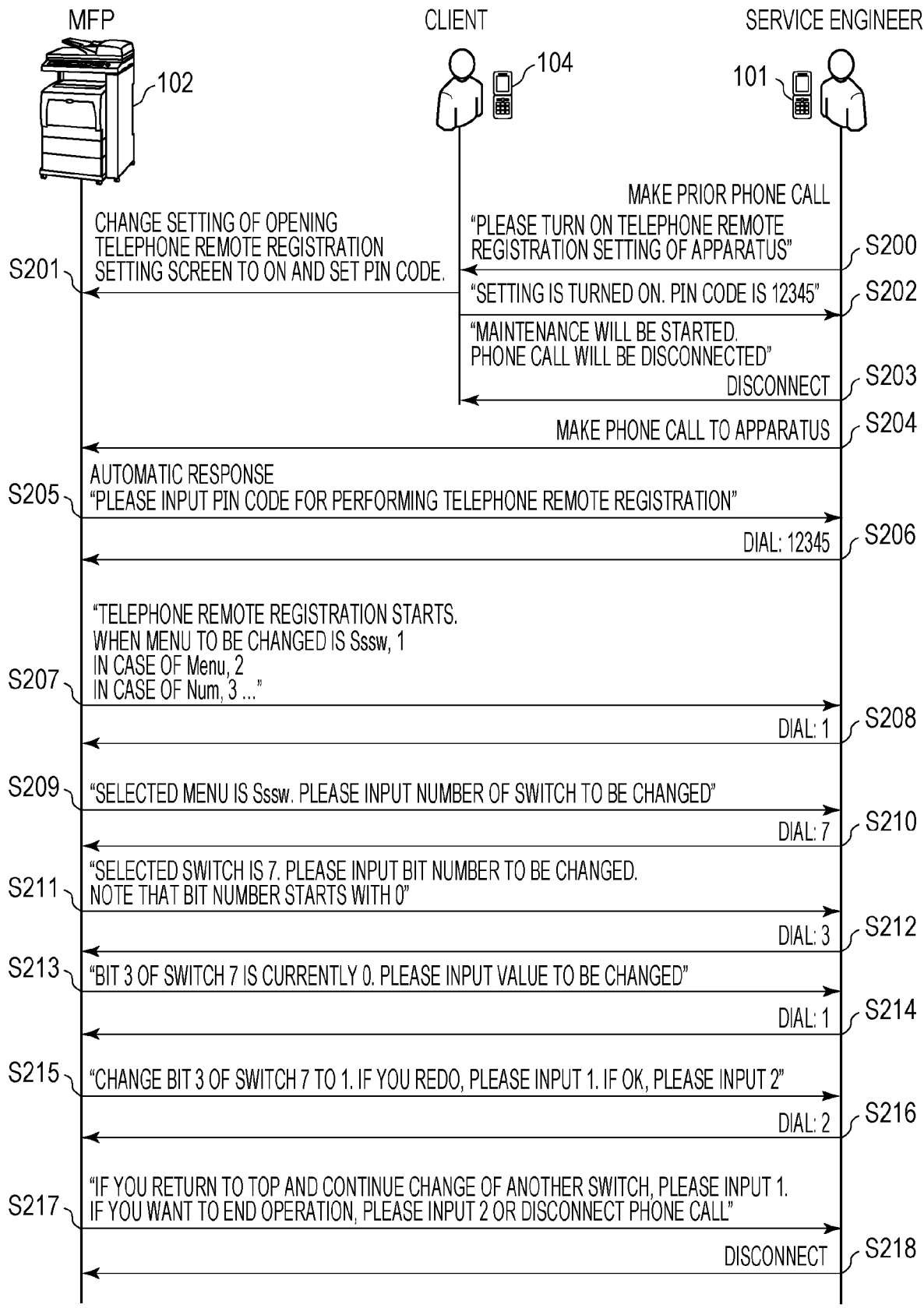
FIG. 2 is a diagram illustrating a sequence during use of a communication system.

Next, a sequence in the case of use of the present system is described in conjunction with FIGS. 2, 9A, and 9B. FIG. 2 is a diagram illustrating a sequence during use of a communication system. FIG. 9A is a view illustrating a setting screen of telephone remote setting. FIG. 9B is a view illustrating a completion screen of telephone remote setting processing.

In this sequence, first, the service engineer makes a phone call to the client's telephone 104 by using the telephone 101. Then, the service engineer tells the client to change the use setting of telephone remote setting of the MFP 102 to ON (step 200. Hereinafter, step is indicated by S like S200). The client then operates the MFP 102 in S201, opens a telephone remote setting screen 900 of FIG. 9A and presses an ON button 901. When the setting is ON, a PIN code input field 903 becomes an inputtable state, and any PIN code is set therein, and an OK button 904 is pressed to save the setting. This PIN code is to prevent a large number of unspecified persons from using the telephone remote setting function. Then, in S202, the client tells the service engineer the number of the set PIN code and the telephone number of the MFP 102. The service engineer disconnects the client's telephone 104 to perform telephone remote setting using the telephone 101 (S203).

Next, the service engineer makes a phone call to the MFP 102 using the telephone 101 (S204). The MFP 102 that is capable of voice communication makes an automatic response to the phone call and connects a line. Then, first, a guidance voice urging PIN code input is sent to a line 103 (S205). A method for generating voice guidance used for the description of the sequence will be described later. The service engineer who has heard the voice guidance inputs the number of the PIN code heard from the client by using dial buttons of the telephone (S206). The MFP 102 detects the PIN code from the line 103 (detailed detection method will be described later). When the value matches the value of the registered PIN code, a guidance voice related to a registered menu for which a setting change is performed is sent to the line 103 (S207). The guidance voice at this time provides guidance about each registered menu and the corresponding sequence numbers starting with 1 such that selection of the number enables determination of a registered menu. The service engineer follows the guidance and inputs the number for selecting a registered menu on the telephone 101 (S208). When the MFP 102 detects a number input from the line 103, the MFP 102, in order to confirm a selected menu and to select a switch to be changed, generates a guidance voice, e.g., "Selected menu is Sssw. Please input the number of a switch to be changed" and sends the guidance voice to the line 103 (S209). Next, the service engineer inputs the number of the switch on the telephone 101 (S210). The MFP 102 generates a guidance voice for confirming the number of the selected switch and for selection of a bit number to be changed if the switch is a bit switch, and sends the guidance voice to the line 103 (S211). The service engineer inputs the number for selecting a bit number on the telephone 101 (S212). The MFP 102 automatically generates a guidance voice that urges input of the number of the selected bit, a current registered value of the bit switch, and a replacement value, and sends the guidance voice to the line 103 (S213). The service engineer inputs a replacement value (1 or 0 in the case of a bit switch) on the telephone 101 (S214). When the MFP 102 detects a replacement value from the line, the MFP 102 sends a guidance voice for confirming a change of the value of the switch to the line 103 (S215). The service engineer dials (inputs) 2 if not redoing the change (S216). Next, the MFP 102 sends a guidance voice for confirming whether to continuously perform the operation on another switch or to end the operation, to the line 103 (S217). In the example of the drawing, the service engineer disconnects the phone call to end the processing (S218).

<System Configuration>

Figure 3:
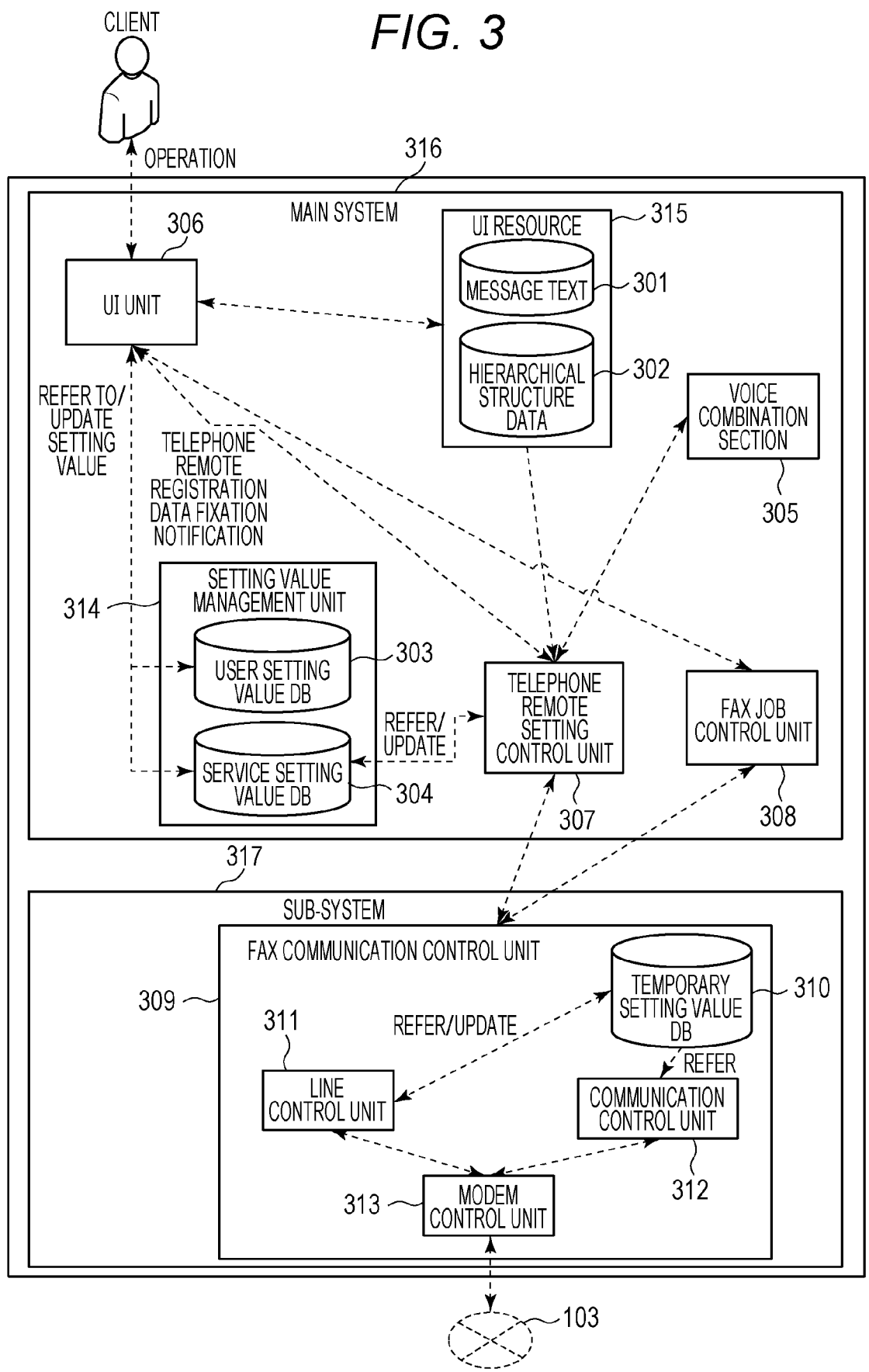
FIG. 3 is a block diagram illustrating a logic configuration of a communication system.

Next, a system configuration is described in conjunction with FIG. 3. FIG. 3 is a block diagram illustrating a logic configuration of a communication system. A description is given by way of an example in which the system configuration includes two systems: a main system 316 and a sub-system 317. A UI unit 306 is a user interface that receives input for operating the MFP 102 or displays a state of the MFP 102. Note that the UI unit 306 performs displaying on the basis of a UI resource 315, e.g., a message text 301 or hierarchical structure data 302. The message text 301 is a text for display on each component, e.g., a button or a display label of the UI unit 306. The hierarchical structure data 302 is data that predefines a hierarchy of a display component of each function screen or predefines a hierarchy of registered menus.

A setting value of the apparatus is registered on a setting value management unit 314. The setting value includes a user setting value DB 303 in which data the client can set and refer to is registered and a service setting value DB 304 in which data only the service engineer can set and refer to is registered. The value of ON/OFF of the telephone remote setting and the value of PIN code of FIG. 9A are saved as part of the user setting value DB 303.

A FAX job control unit 308 is a module for control of a send job and a reception job of FAX. In the case of FAX transmission, a job is input on the basis of the operation from the UI unit 306. In the case of FAX reception, a FAX communication control unit 309 detects an incoming call and the FAX job control unit 308 is notified of this fact, and a FAX reception job is generated.

The FAX communication control unit 309 is a module that operates on the sub-system 317, and controls connection and release of a line with a line control unit 311 and controls a communication protocol of a FAX with a communication control unit 312. Moreover, a modem control unit 313 is a module that controls a MODEM 415, and receives an instruction from the line control unit 311 or the communication control unit 312 to control the MODEM 415, and receives a response from the MODEM 415 and sends back a result.

The FAX communication control unit 309 operates on the sub-system 317, and therefore cannot directly refer to the setting value management unit 314 on the main system 316. Accordingly, at a time of activation of the system, a setting value related to FAX communication is temporarily copied from the setting value management unit 314 on the main system 316 to a temporary setting value DB 310 on the sub-system 317. The FAX communication control unit 309 operates by referring to the value of the temporary setting value DB 310. Each time the FAX-related value of the setting value management unit 314 is changed during operation of the system, the value is copied to the temporary setting value DB 310.

When the setting value of the telephone remote setting is ON, a telephone remote setting control unit 307 receives a notification of an incoming call (calling) from the FAX communication control unit 309 and performs operation control of telephone remote setting. In order to generate voice guidance data with a voice combination section 305, the telephone remote setting control unit 307 generates text data for input. Then, the text data is generated on the basis of data of the UI resource 315 or the setting value management unit 314. The voice combination section 305 combines voice data of PCM on the basis of the input text data. The telephone remote setting control unit 307 hands over the generated voice data of PCM to the FAX communication control unit 309. Then, the voice data of PCM handed over via the line control unit 311 and the modem control unit 313 of the FAX communication control unit 309 is sent to the line 103 with the use of a PCM output function of the MODEM 415. Moreover, a dial number input from the telephone 101 of the service engineer is converted from a tone signal to a numeric value by a DTMF (Dual-Tone Multi-Frequency) detection function of the MODEM 415. Then, the telephone remote setting control unit 307 is notified of the numeric value via the line control unit 311 from the modem control unit 313. Thus, while the voice guidance is sent to the line 103, a remote setting operation can be performed according to an instruction through dial input on the telephone 101.

<System Hardware>

Figure 4:
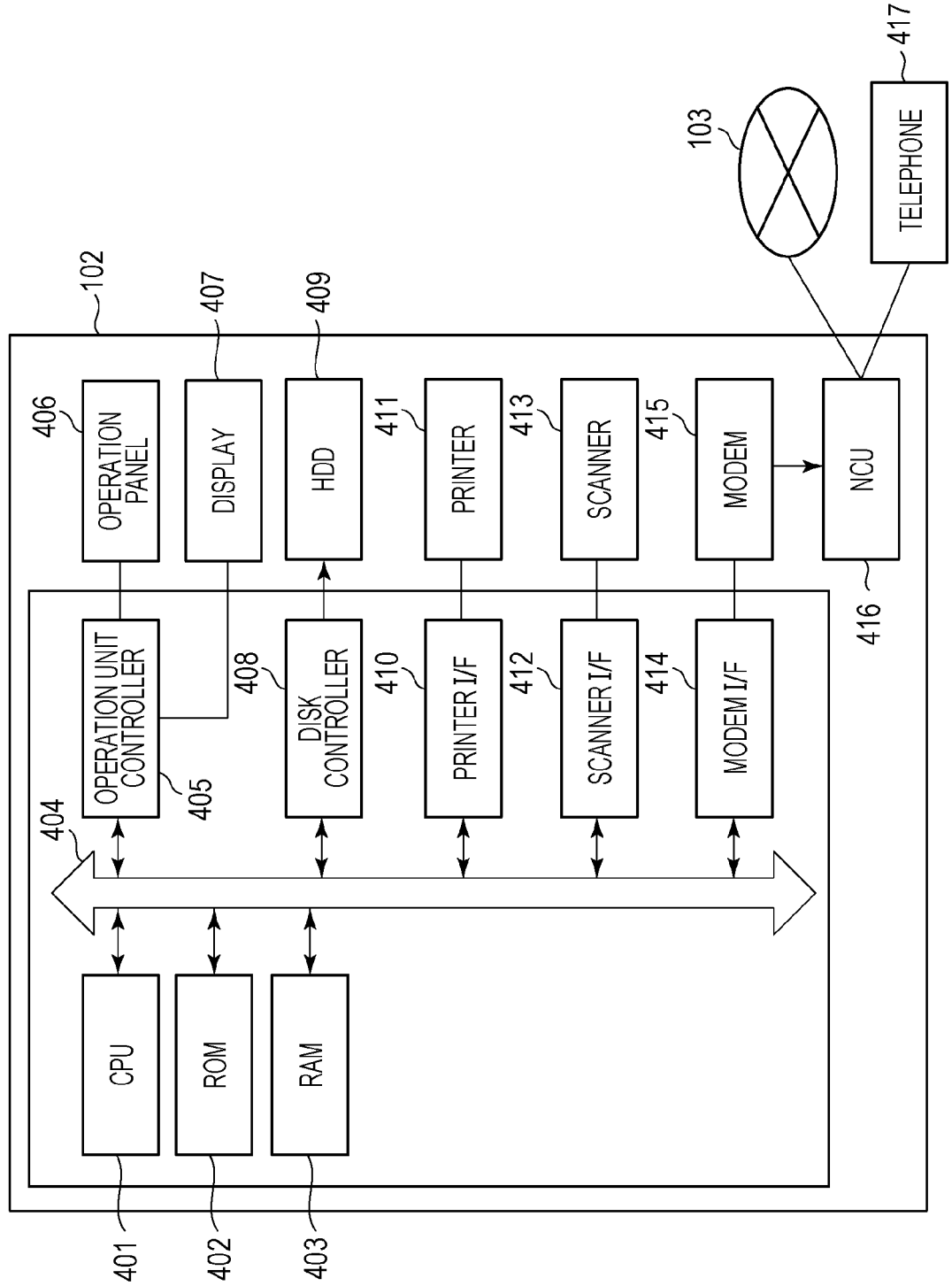
FIG. 4 is a block diagram illustrating a hardware configuration of an MFP.

Next, a hardware configuration of the present system is described in conjunction with FIG. 4. FIG. 4 is a block diagram illustrating a hardware configuration of the MFP 102.

In FIG. 4, the MFP 102 includes a CPU 401 that executes software stored on a ROM 402 or, for example, a HDD 409, and the CPU 401 collectively controls each device connected to a system bus 404. Note that the HDD 409 may also be used as a temporal storage location for an image depending on the situation.

A RAM 403 is a memory that functions as a main memory, a work area, or the like of the CPU 401. An operation unit controller 405 is a controller that is connected to various buttons of the MFP 102, an input unit (reception unit) of a control panel 406 (touch panel) or the like, or a display unit (output unit), e.g., a display 407, and controls input/output of information. A disk controller 408 is an interface that is connected to the HDD 409 and controls reading and writing of information. A printer 411 is an apparatus that performs printing (image forming) on a sheet (paper). Note that a printing method may not be an electrophotographic method. A printer I/F 410 is an interface that is connected to the printer 411 and controls input/output of information.

A scanner 413 is an image reader for reading an image printed on paper. In many cases, an ADF (auto document feeder) (not illustrated) is optionally mounted on the scanner 413, enabling automatic reading of a plurality of original documents. A scanner I/F 412 is connected to the scanner 413 and controls input/output of information.

The MODEM 415 is a circuit that demodulates a modulated signal received from the telephone line 103 or conversely modulates a signal from the apparatus and sends the modulated signal to the telephone line 103. A MODEM I/F 414 is connected to the MODEM 415 and controls input/output of information. An NCU 416 is a circuit that is connected to the MODEM 415. The NCU 416 is arranged at an interface unit between the telephone line 103 and the FAX. The NCU 416 performs line control in which a signal coming from the telephone line 103 is detected and transferred to the MODEM 415 or the telephone line 103 is changed over to a FAX or a telephone 417.

<System Software>

Figure 5:
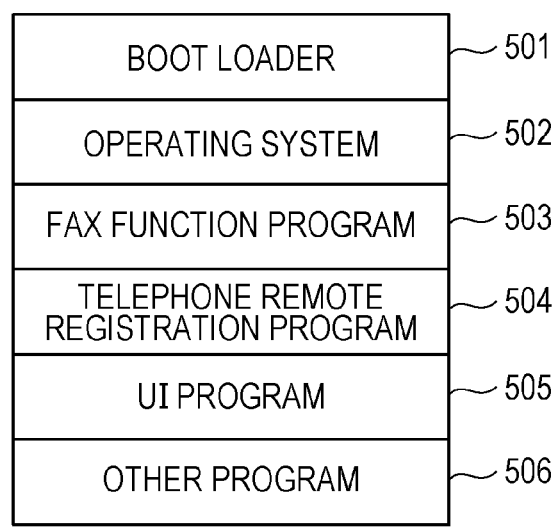
FIG. 5 is block diagram illustrating a software configuration of an MFP.
Figures 7, 7A:
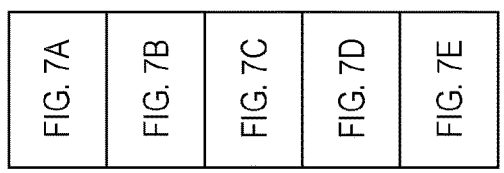
Figure 7B:
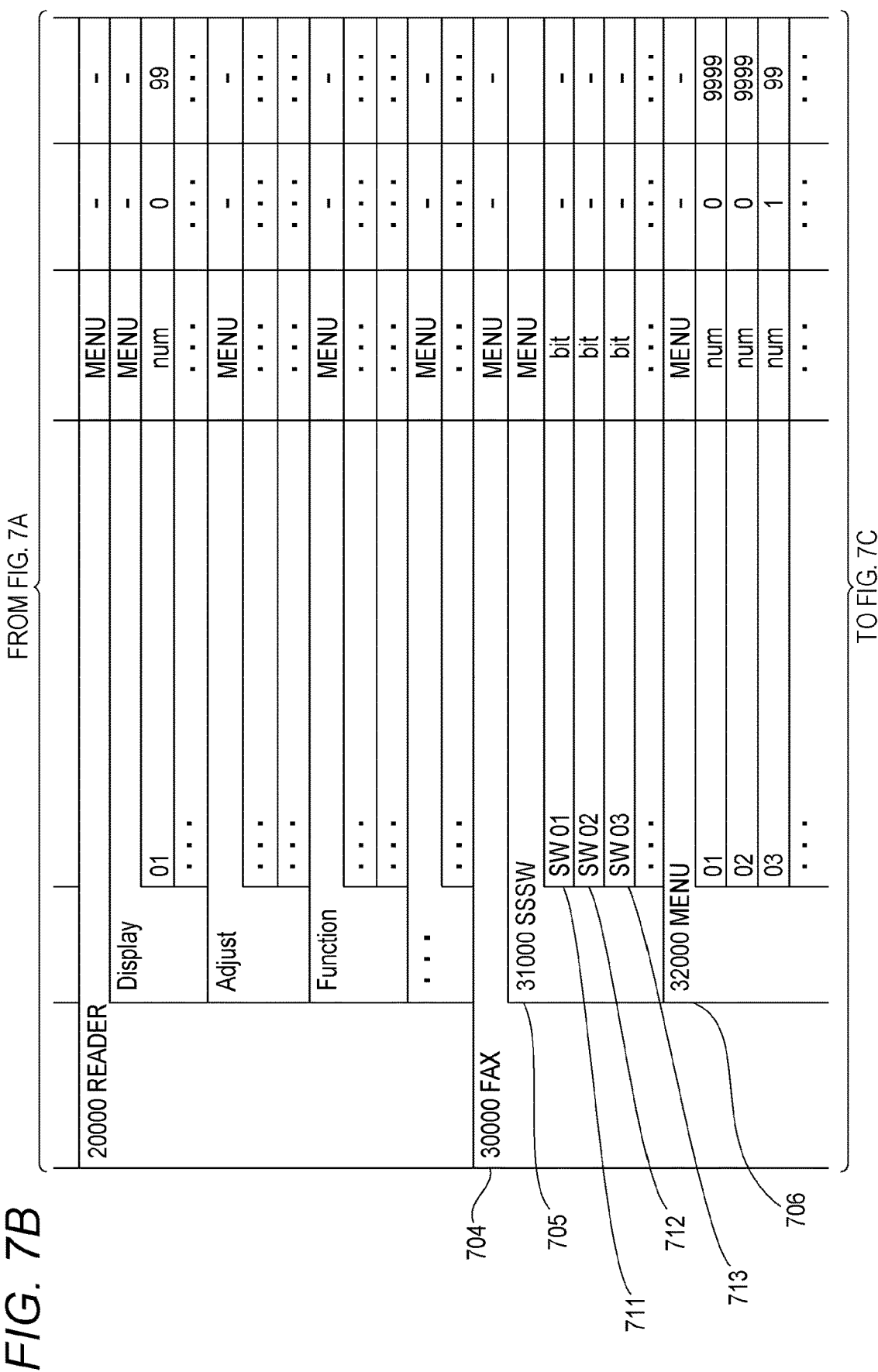
Figure 7C:
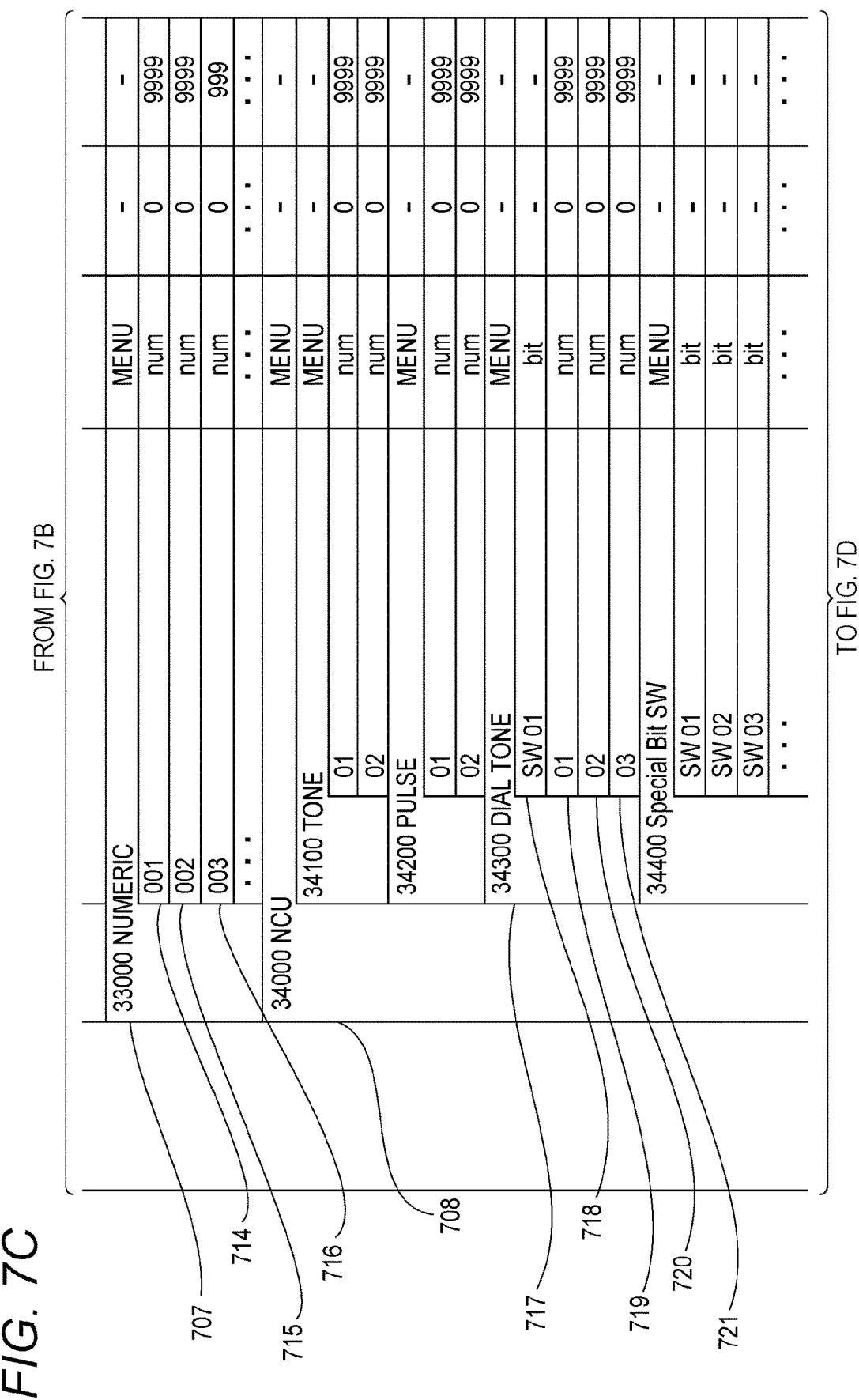
Figure 7E:
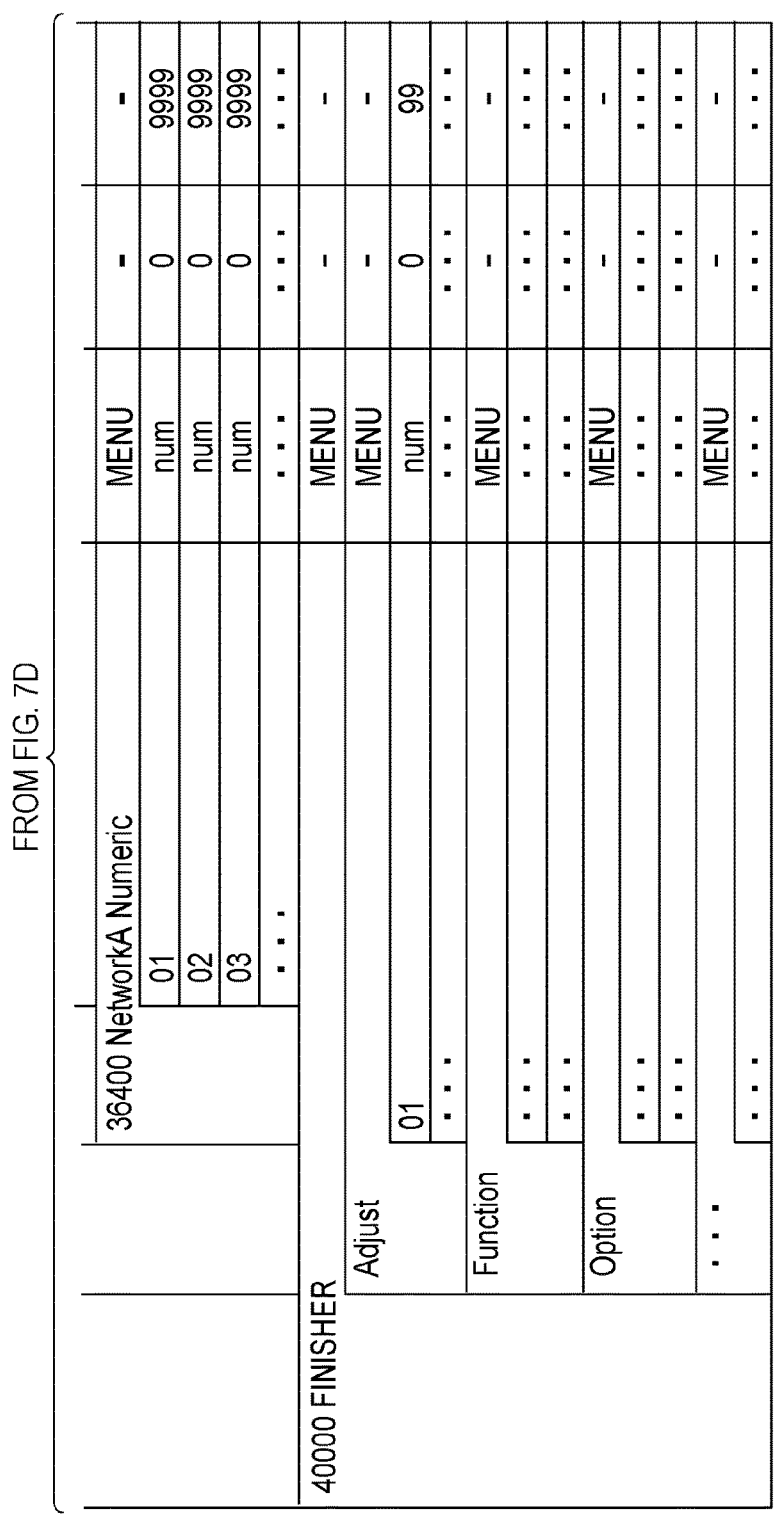

Software of the MFP 102 is described in conjunction with the software block diagram of FIG. 5.

A boot loader 501 is a program executed immediately after power-on of the MFP 102. Such a program includes a program for executing various activation sequences required for activation of the system.

An operating system 502 is a program for the purpose of providing an execution environment for various programs that achieve a function of the MFP 102. The operating system 502 mainly provides functions including resource management of a memory of the MFP 102, i.e., the ROM 402, the RAM 403, or the HDD 409, and basic input/output control of the other parts illustrated in FIG. 4.

A FAX function program 503 is a program that performs transmission and reception of a FAX. The FAX function program 503 corresponds to the FAX communication control unit 309. The FAX function program 503 controls the scanner 413 to read an image for FAX transmission onto the RAM 403 or controls the MODEM 415 to encode the image data and then convert the image data to a modulated wave and send it to the line 103. In contrast, at the time of FAX reception, the FAX function program 503 controls the MODEM 415 to demodulate the modulated wave received from the line and extract the encoded data. Furthermore, the FAX function program 503 controls the disk controller 408 to save the extracted encoded data on the HDD 409 or controls the printer I/F 410 and sends the extracted encoded data to the printer 411 for printing.

A telephone remote setting program 504 is a program having a function described as a feature in the present example. The telephone remote setting program 504 corresponds to the telephone remote setting control unit 307. With this program, the service setting value DB 304 of the MFP 102 is referred to and updated on the basis of a dial operation from the telephone 101. Note that, in the present example, a description is given of reference and updating of the service setting value DB 304, but the user setting value DB 303 may be referred to and updated by this program.

A UI program 505 is a display control program for causing the display 407 to display various UI screens. Moreover, the UI program 505 is also a program for receiving a hardware key input or the like of the control panel 406 and performing processing.

An other program 506 is a collective term of programs not included in any of the above among programs that can be executed by the MFP 102 and stored in the ROM 402. Examples of the other program 506 include a printing control program for printing image data with the printer 411 and a voice combination program that functions as the voice combination section 305. A detailed description of these programs is omitted.

<Service Setting Screen>

Next, a description is given of a UI screen for registering a service setting value of the MFP 102 in conjunction with FIGS. 6A to 6C.

FIG. 6A is a view illustrating a service setting screen A. A service setting screen A 600 corresponds to the top screen of the service setting screen. In service setting, parameters that are difficult to adjust without expertise knowledge are basically set, and this screen cannot be displayed without undisclosed operation which is known only to service engineers and developers.

A button 601 is a button for displaying a service setting screen associated with a copier (copying function) and general apparatuses. A button 602 is a button for displaying a service setting screen associated with a scanner (reading function). A button 603 is a button for displaying a service setting screen 610 or 620 associated with a FAX. A button 604 is a button for displaying a service setting screen associated with a finisher (post-processing function).

FIG. 6B is a view illustrating a service setting screen B. A service setting screen B 610 is an example of a screen on which setting of a bit-type service switch associated with a FAX is performed. The service setting screen B 610 can change over display of a screen by changing over a tab at the upper part of the screen. This drawing is an example of display of a setting tab of a bit-type switch called Sssw 611. A switch group 612 is an area in which switches are displayed in order. A parameter group 613 is an area that displays a current registered value of each switch. Each switch can register 8-bit information and can set the bit unit to "0" or "1". Note that, when there are such many switches that the switches cannot be displayed on the screen, the screen can be scrolled when the button 614 or the button 615 is pressed.

When the OK button 617 is pressed after the setting is changed, the setting is fixed and saved on the service setting value DB 304. Moreover, when the return button 616 is pressed, the screen returns to the previous screen (here, the service setting screen A 600, which is the top screen).

FIG. 6C is a view illustrating a service setting screen C. A service setting screen C 620 is an example of a screen for setting a numeric value-type service switch associated with a FAX. This drawing is an example of displaying a setting tab of a numeric value-type switch, Num 621. A switch group 622 is an area in which numeric value-type switches are sequentially displayed. A parameter group 624 is an area in which current registered values of the switches are displayed. An information group 623 is an area in which a maximum value and a minimum value of a settable range of the switches are displayed. Scroll buttons 614 and 615, a return button 616, and an OK button 617 of the drawing are the same as those described with regard to FIG. 6B and therefore descriptions are omitted.

FIGS. 7A to 7E are diagrams illustrating a menu hierarchical structure of service setting. Menu structure data of this service setting screen is part of the hierarchical structure data 302 in the UI resource of FIG. 3 and includes item columns including a menu item name column 700, a type column 701, a minimum value column 702, and a maximum value column 703. The menu item name column 700 indicates hierarchical structure data. For example, a switch displayed on the tab screen "Sssw" of FIG. 6B corresponds to SW01 (711), SW02 (712), or SW03 (713) of FIGS. 7A to 7E. Moreover, registered data of these switches is saved on the service setting value DB 304. An ID described in the menu item name column 700 is a message ID corresponding to a UI menu message list 800 of FIG. 8. FIG. 8 is a diagram illustrating a menu message list of a service setting screen. Note that the UI menu message list 800 is part of the message text 301 of the UI resource of FIG. 3. The menu item name column 700 is a hierarchical structure, and the service setting screens 600, 610, and 620 are drawn on the display 407 according to the hierarchical structure indicated herein. Moreover, as a menu message displayed on the service setting screens 600, 610, and 620, those of the UI menu message list 800 linked to the corresponding message IDs are used. Note that the menu hierarchy exemplarily illustrated in FIGS. 7A to 7E is a mere example, and other menus may be present.

The type column 701 indicates whether the item is a "menu" (those having a subordinate item) or a switch. When the type column 701 is not a menu, the type column 701 indicates "bit" or "num" to indicate whether the switch is a bit-type switch or a numeric value-type switch. A value input in the minimum value column 702 indicates the minimum value of the registered value, and a value input in the maximum value column 703 indicates the maximum value of the registered value. When the type column 701 is a bit-type, it is apparent that the minimum value column 702 is "0" and the maximum value column 703 is "1" and therefore this section does not particularly predefine any description.

<Method for Automatic Generation of Voice Guidance>

Moreover, the hierarchical structure data 302 and the UI menu message list 800 are also used for automatic generation of a guidance voice at the time of operation of telephone remote setting. The guidance voice is a voice message urging selection of a service switch. As described in the chapter "System configuration", PCM (Pulse Code Modulation) of a guidance voice is generated when text data is input to the voice combination section 305. In the following, regarding a case where the guidance starts with the item FAX 704, a description is given of a method for automatic generation of text data to be handed over to the voice combination section 305.

A guidance voice used for voice guidance is generated through use of various pieces of information. For example, regarding a unit that dynamically varies with selection by the service engineer, a message of the UI menu message list 800 or a value obtained from the service setting value DB 304 is used. For the other fixed message units, a message illustrated in FIG. 19 is used. FIG. 19 is a diagram illustrating a message list of a fixed part used for generation of voice guidance. When voice guidance is executed, first of all, it is necessary to generate a guidance voice for urging PIN code input. This message is fixed, and therefore it is sufficient if a message 1900 of FIG. 19 is used as it is as text data (character string data) and handed over to the voice combination section 305. When PIN code input is finished, next, a guidance voice for starting a telephone remote setting operation is necessary. Similarly, a fixed message 1901 is used as it is as text data and handed over to the voice combination section 305 to generate a guidance voice.

Next, a guidance voice for menu selection is necessary. A guidance voice for menu selection is performed starting with text generation. In the case of the FAX 704, the type column 701 is "menu". Therefore, all types of subordinate items are listed. The type columns 701 of subordinate items 705, 706, 707, 708, 709, and 710 are also all "menu". Therefore, it is sufficient if the UI menu message list 800 is searched using their message IDs. Thus, it is possible to obtain a message text corresponding to the item. Furthermore, each menu is designated by sequential numbers starting with "1" such that these menus can be selected by dial number input on the telephone 101. A text is generated using the obtained information and a fixed message 1903. In the case of "@1" of the fixed message 1903, a menu message text is assigned to "@1" and a number used for selection is assigned to "@2". Furthermore, the fixed message 1902 to be attached to the head of the message and a fixed message 1904 attached to the tail are used, and thus a text described below is generated.

"When a menu to be changed is Sssw, please input 1, in the case of Menu, please input 2, in the case of Num, please input 3, in the case of Ncu, please input 4, in the case of Type, please input 5, and in the case of IPFAX, please input 6".

For example, here it is assumed that dial "1" is input and "Sssw" is selected. Because the type column 701 of SSSW 705 is "menu", similarly to the above, all the types of the subordinate items are listed. Then, items 711, 712, 713 . . . are all "bit". Accordingly, it can be seen that the subordinates of the "SSSW" are all bit-type service switches. Voice guidance for selecting the numbers of the switches on the telephone 101 is necessary. However, when sequential numbers are assigned in the same way as described above, guidance can be very long when the number of switches is large. Therefore, when the subordinate items are all switches of a particular type, a fixed message 1905 is used to generate a text described below.

"Selected menu is Sssw. Please input the number of the switch to be changed".

In the above text, "@1" of the fixed message 1905 is replaced with the text "Sssw" corresponding to an item 31000.

Here, it is assumed that dial "3" is input and "switch 03" 713 is selected. Then, a fixed message 1906, a message for selecting the number of a bit to be changed, is used to generate a text described below.

"Selected switch is 3. Please input the bit number to be changed. Note that the bit number starts with 0".

In the above text, "@1" of the fixed message 1906 is replaced with "3" input by dialing.

Here, it is assumed that dial "2" is input and "bit 2" is selected. Then, the value of "bit 2" of the switch 03 (713) is obtained from the service setting value DB 304, and a fixed message 1907 for confirming a change is used while giving a notification of a current value to automatically generate a text described below.

"Bit 2 of the switch 3 is currently 0. Please input a replacement value".

In the above text, "@1" of the fixed message 1907 is replaced with "3", "@2" is replaced with "2" input by bit number selection, and "@" is replaced with a number obtained from the service setting value DB 304.

Moreover, after the input of a replacement value is received, as a message for confirming that fact, a fixed message 1908 is used to automatically generate a text described below.

"Bit 2 of the switch 3 is changed to 1. If you redo, please input 1. If ok, please input 2".

In the above text, "@1" of the fixed message 1908 is replaced with "3", "@2" is replaced with "2", and "@" is replaced with a value input by dialing.

By the aforementioned method, texts in the case of selection and change of a bit switch can be automatically generated.

Note that when a NUMERIC 707, a menu for a numeric value-type switch, is selected, the case becomes as described below. When the types of subordinate items 714, 715, and 716 of the NUMERIC 707 are listed, they are all "num" and a numeric value-type switch. Therefore, a voice guidance text for selecting them uses the fixed message 1905 and becomes as follows.

"Selected menu is Num. Then, please input the number of a switch to be changed".

Here, it is assumed that dial 1 is input and switch 001 (714) is selected. Then, a value of the switch 001 (714) is obtained from the service setting value DB 304. Then, a fixed message 1909 for confirming the change is used while giving a notification of a current value (for example, 15) to automatically generate a text described below.

"Switch 1 is currently 15. Please input a replacement value".

In the above text, "@1" of 1909 is replaced with "001" and "@2" is replaced with a value obtained from the service setting value DB 304.

Moreover, after input of the replacement value is received, as a message for confirming that fact, a fixed message 1910 is used to automatically generate a text described below.

"Switch 1 is changed to 13. If you redo, please input 1. If ok, please input 2".

In the above text, "@1" of 1910 is replaced with "1" and "@" is replaced with a value input by dialing.

By the above method, a voice guidance generation text in the case of selection and change of a numeric value-type switch can be automatically generated.

Moreover, DIAL TONE 717 is a menu under which a bit-type switch 718 and numeric value-type switches 719, 720, and 721 are present. When such a menu is selected, a fixed message 1911 is used for selecting them, and a text described below is generated.

"Selected menu is DIALTONE. When a switch to be changed is a bit switch, please input 1. In the case of a numeric value switch, please input 2".

In the above text, "@1" of 1911 is replaced with "DIAL-TONE" of a menu message 34300.

Here, when "1" of a bit switch is selected, a fixed message 1912 for selecting a bit number is used to generate a text described below.

"Switch to be changed is a bit switch. Please input the number of a bit to be changed. Note that the number starts with 0".

When "2" of a numeric value switch is selected, a fixed message 1913 is used to generate a text described below.

"Switch to be changed is a numeric value switch. Please input the number of a numeric value switch to be changed".

Thereafter, it is sufficient if the same text as those in the case of a bit-type switch and a numeric value-type switch described above is generated.

Moreover, after the change of the switch is received, in order to confirm as to whether to continue or end the operation, a fixed message 1914 is used to generate a text described below.

"If you return to the top and continue a change of another switch, please input 1. If you end the operation, please input 2 or disconnect the telephone".

As described above, when the same data (hierarchical structure data of FIGS. 7A to 7E and the UI menu message list 800) is used for both the service setting screen and the voice guidance, there is an effect whereby voice guidance generation processing does not need modification correction even when a setting item is changed. That is, as compared with the case of performing maintenance of both the service setting screen and the voice guidance, the cost of maintenance can be reduced.

<Processing Flow of MFP 102 During Telephone Remote Setting>

Figures 10, 10A:
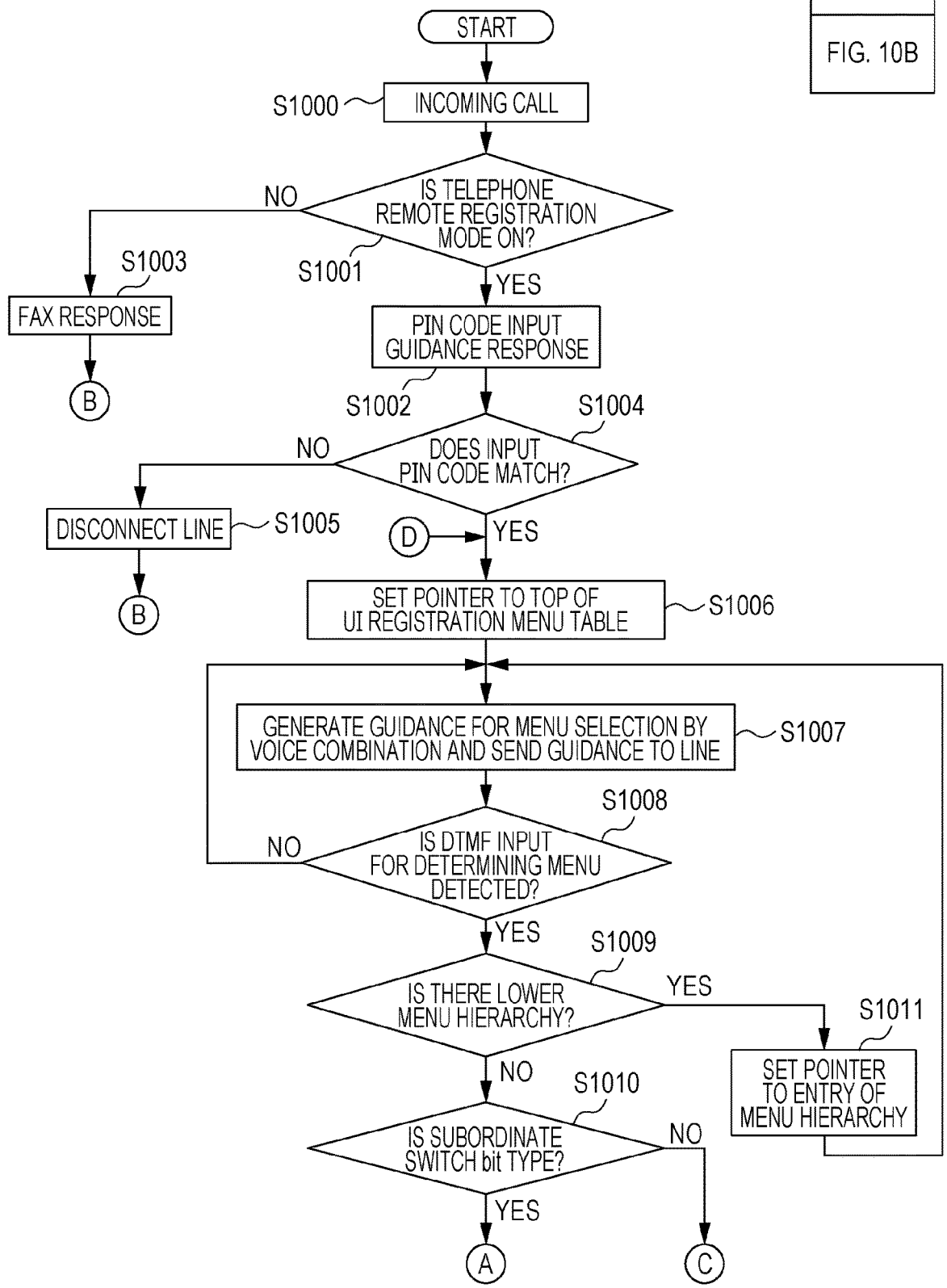
FIGS. 10A and 10B depict diagrams illustrating a flow of telephone remote setting.
Figure 10B:
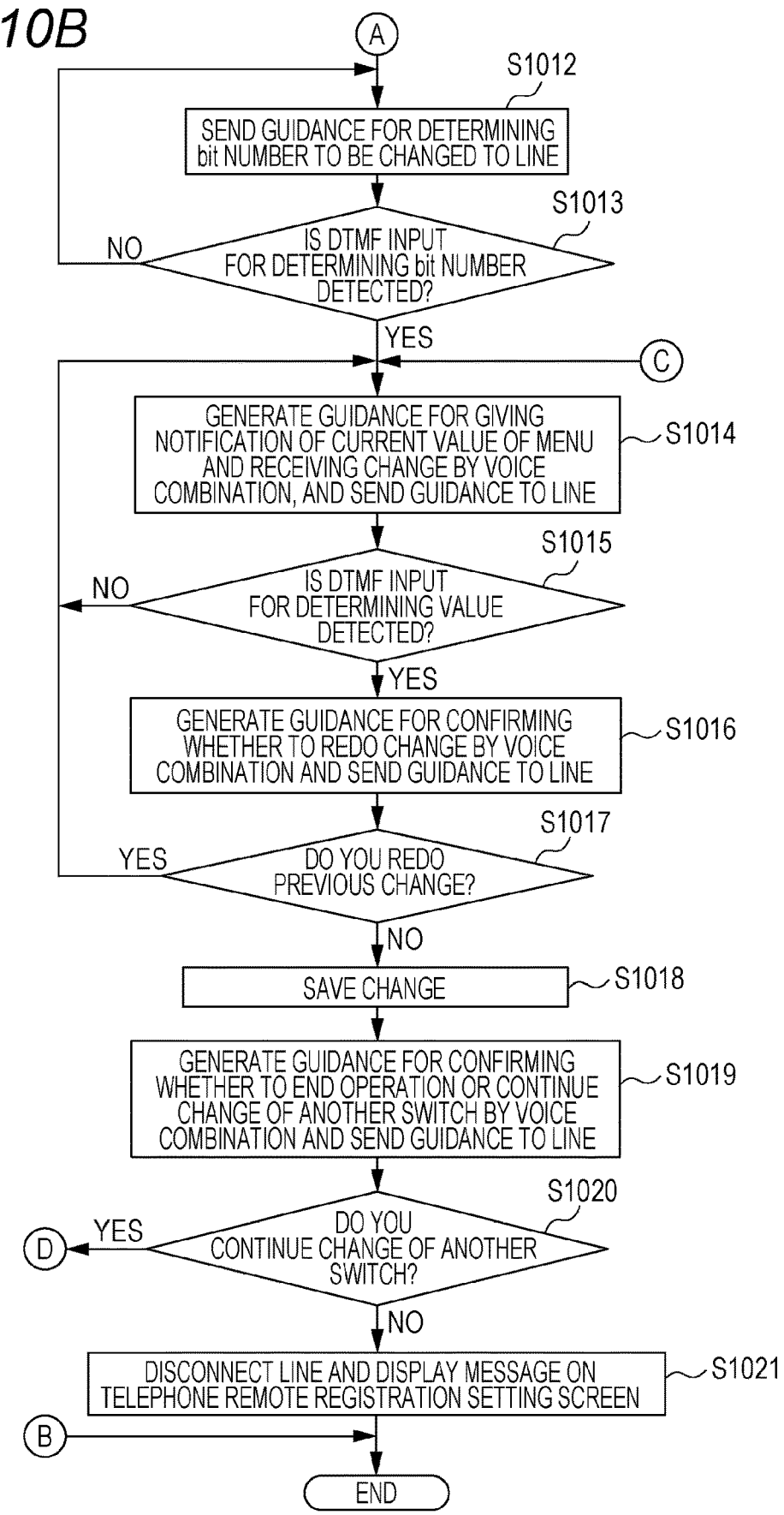

Next, a description is given of a processing flow of the MFP 102 of the telephone remote setting according to Example 1 in conjunction with FIGS. 10A and 10B. FIGS. 10A and 10B are diagrams illustrating a flow of the telephone remote setting. Note that this series of processing is performed when a program describing a procedure described below so as to be executable by the MFP 102 is read onto the RAM 403 from the ROM 402 and then the program is executed by the CPU 401.

First, in S1000, the NCU 416 detects an incoming call from the line 103. Then, in S1001, a value of the telephone remote setting saved on the user setting value DB 303 is read. In the case of OFF, FAX response is performed in S1003. In the case of ON, a guidance response of PIN code input is performed in S1002. In the guidance response of PIN code input, first, a text "telephone remote setting starts. First, please input a PIN code" saved on the ROM 402 is read. Then, by the method described in <System configuration>, the text is handed over to the voice combination section 305 such that voice data of PCM is automatically generated and sent to the line 103 by the MODEM 415.

The step proceeds to S1004 where by the method described in <System configuration>, a dial number from the telephone 101 is detected for a certain period of time by the DTMF detection function of the MODEM 415. When the dial number is obtained within the period of time and the number matches the number registered on the PIN code input field 903 of the telephone remote setting screen 900, the step proceeds to S1006. When the numbers do not match or the number cannot be detected within the certain period of time, the step proceeds to S1005 where the line is disconnected and the processing ends. As described above, whether the input dial number matches the registered number varies depending on a PIN code set by the user. That is, the guidance content of voice guidance is determined by content set by the user.

In S1006, a value of a pointer indicating a start position of menu selection of voice guidance is initialized. In Example 1, a description is given of an example of starting with the FAX 704. Therefore, the initial value of the pointer is set to the FAX 704. Next, in S1007, voice guidance PCM data for menu selection is generated by the method described in <Method for automatic generation of voice guidance>, and sent to the line 103 using the MODEM 415. In S1008, a dial number is detected for a certain period of time by the DTMF detection function of the MODEM 415. When the number is detected and selection of guidance is determined with the number, the step proceeds to S1009. When the detected number does not match an option of the voice guidance or when the number is not detected within the certain period of time, the step returns to S1007 and output of voice guidance is performed again.

In S1009, it is determined whether the type column 701 of the item determined in S1008 is "menu". In the case of "menu", the value of the pointer indicating the position is set to the item and the step returns to S1007.

In S1009, when the type column 701 of the item is not "menu", i.e., in the case of switch, it is determined in S1010 whether the type column 701 is bit type. In the case of bit type, a guidance voice for determining the bit number to be changed is generated by the method described in <Method for automatic generation of voice guidance> in S1012. The guidance voice is sent to the line 103 using the MODEM 415. Next, a dial number is detected for a certain period of time by the DTMF detection function of the MODEM 415 in S1013. When the number is detected and the bit number is determined by the number, i.e., when the number is in a range of "0 to 7", the step proceeds to S1014. When the number is outside of the range and when the number is not detected within the certain period of time, the step returns to S1012.

When the determination in S1010 is No, i.e., when the type of the switch is of a numeric value type, the step directly proceeds to S1014 from S1010. In S1014, by the method described in <Method for automatic generation of voice guidance>, a current value of the switch is read from the service setting value DB 304, and voice guidance for confirming the current value and for confirming the change is output to the line 103.

Next, a dial number is detected for a certain period of time by the DTMF detection function of the MODEM 415 in S1015. When the number is detected and the number is within a range to which the switch can be set, the step proceeds to S1016. In the case of outside the possible setting range or when the number cannot be detected within the certain period of time, the step returns to S1014.

In S1016, voice guidance for confirming whether to redo the change detected in S1015 (content indicated in S215 of FIG. 2) is generated and sent to the line 103. Then, when the number of selecting to redo the change is detected in S1017, the step returns to S1014. When the number of selecting not to redo the change is detected, the value after the change detected in S1015 is reflected to the service setting value DB 304 (S1018). Moreover, the value after the detected change is also copied to the temporary setting value DB 310 used by the FAX communication control unit 309. Next, in S1019, guidance for selecting whether to end the operation or return to the start and continue to change another switch (content indicated in S217 of FIG. 2) is sent to the line 103. Then, a dial number is detected for a certain period of time by the DTMF detection function of the MODEM 415 in S1020. When the number is detected and the number indicates continuation of change of another switch, the step returns to S1006. When the number is to end the processing or when the line disconnection at the other end is detected by the MODEM 415, the step proceeds to S1021. Note that the disconnection of the line at the other end can be determined by detecting a busy tone sent from the line 103 using a tone detection function of the MODEM 415.

In S1021, the line is disconnected by the MODEM 415, and as illustrated in FIG. 9B, on a screen 950 on which a popup window 951 is superimposed on the telephone remote setting screen 900, a message indicating completion of the setting is displayed and the processing ends.

Note that during the processing flow, the MODEM 415 captures the line. Therefore, transmission and reception operation of the FAX cannot be used. On the UI screen display, an on-hook key 1301 for manually capturing the line is shaded and cannot be pressed on the FAX screen 1300. However, transmission reservation of FAX is possible. Moreover, other functions including copying and printing can be used as usual.

Example 2

In Example 1, a description has been given of the telephone remote setting function that changes a setting value (particularly, a setting value related to FAX) of the MFP 102 via voice communication. Incidentally, for some troubles, e.g., trouble about a FAX system, even if symptoms of failure are heard from the client, there can be several conceivable handling methods (change of service switch). In such a case, it is desirable to perform operation check in order to determine whether the problem has been solved by setting change. Thus, in the present example, a description is given of an example that takes into consideration operability associated with operation check. For example, it is assumed that as a result of operation check, the content of setting change is ineffective in solving a problem. In this case, it is desirable to restore a setting value before the change because a setting value after the setting change can cause a further adverse effect. However, it is work to redo the telephone remote setting to return to the original setting value.

In order to solve this problem, in the present example, the setting value changed by the telephone remote setting is stored in the temporary area as a temporal setting value for operation check. The temporal setting value is reset at the time of reboot of the MFP 102. That is, the temporal setting value is overwritten with a value of the service setting value DB 304 at the time of activation of the MFP 102. The value stored in the temporary area is used as a setting value used for a variety of processing of the FAX function. In the case where the problem has not been solved after operation check, the results of the unnecessary setting change do not remain. Meanwhile, when the problem has been solved after operation check, the client performs fixing operation and the setting value set by the setting change is officially registered.

Note that the configuration of Example 2 is the same as the basic configuration described in Example 1 except for the aforementioned characterizing part. Therefore, the same configurations as those of Example 1 are designated by the same reference symbols and numerals and will not be elaborated.

<Use Case of System>

Figure 12A:
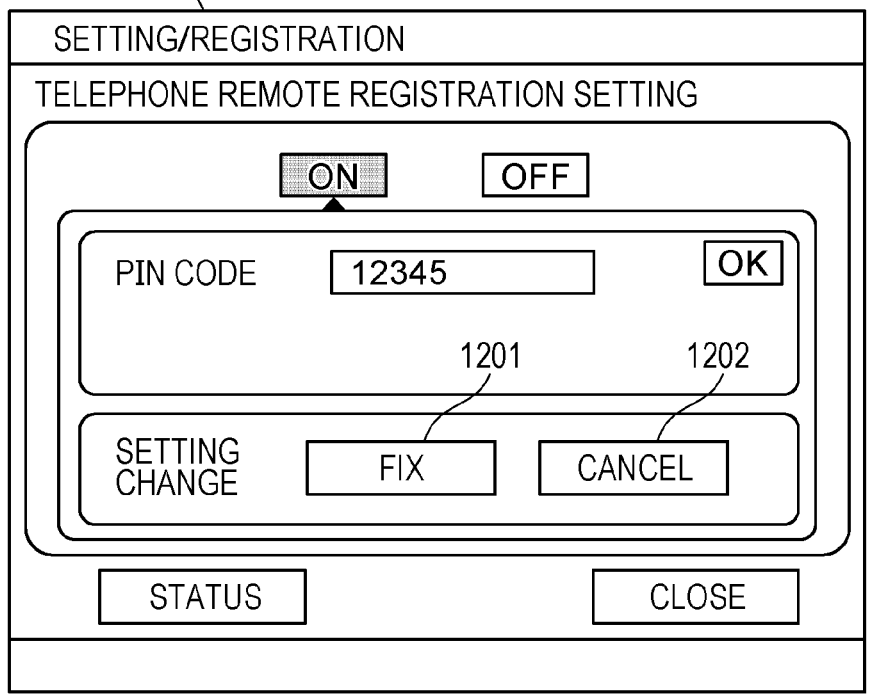
FIG. 12A is a view illustrating a setting screen of telephone remote setting of Example 2.
Figure 12B:
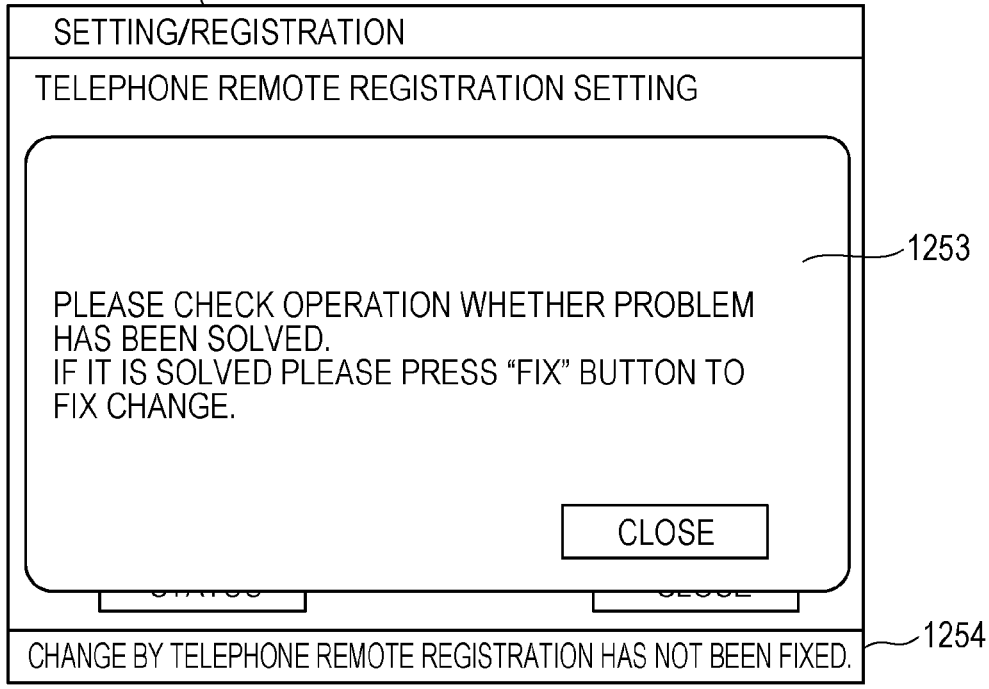
FIG. 12B is a view illustrating a completion screen of telephone remote setting processing of Example 2.
Figure 13:
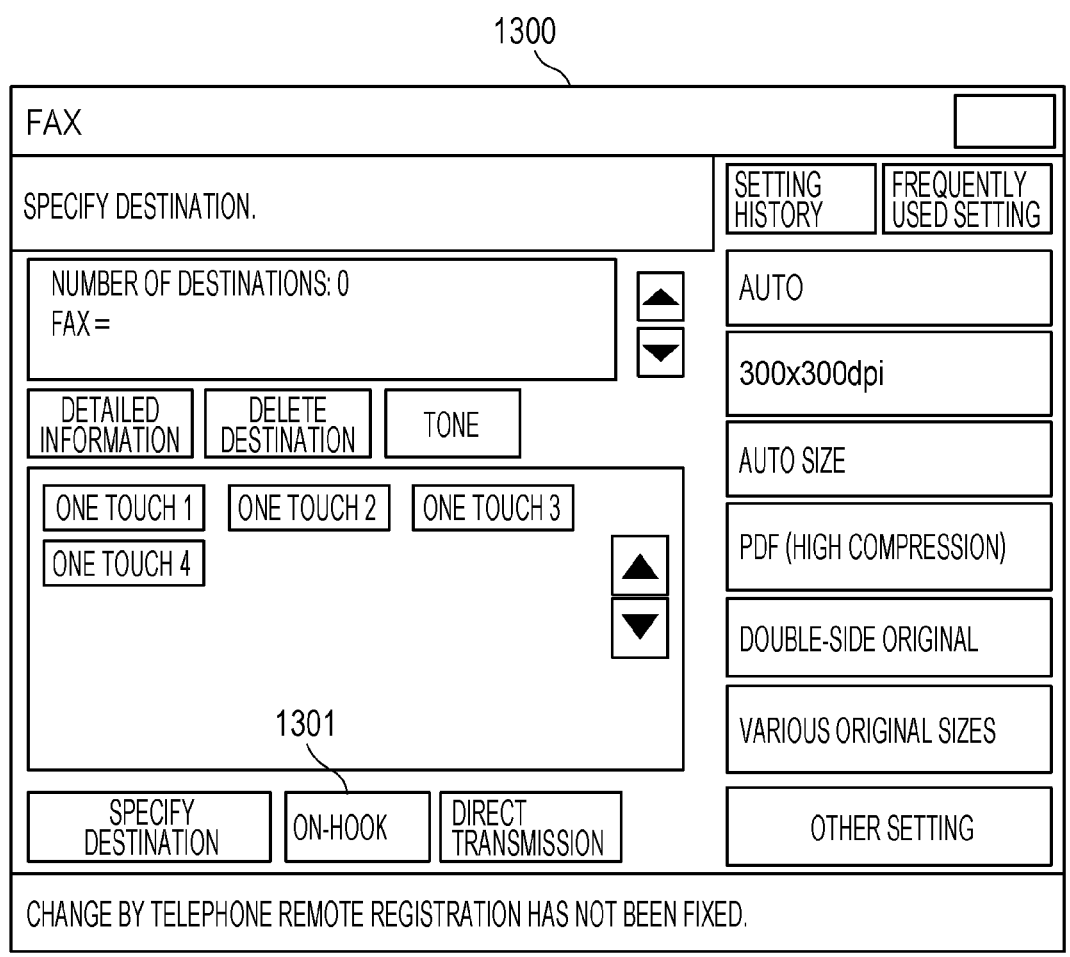
FIG. 13 is a view illustrating a FAX operation screen of Example 2.

In Example 2, after the sequence of FIG. 2 is finished, i.e., after the telephone remote setting is performed, a sequence of FIG. 11 is performed. Thereafter, FIG. 11 is described. FIG. 11 is a diagram illustrating a sequence during use of a system of Example 2. In this sequence, screens illustrated in FIGS. 12A, 12B, and 13 appear. FIG. 12A is a view illustrating a setting screen of telephone remote setting of Example 2. FIG. 12B is a view illustrating a notification screen of telephone remote setting of Example 2. FIG. 13 is a view illustrating a FAX operation screen of Example 2.

After the processing illustrated in FIG. 2, the MFP 102 displays a screen (FIG. 12B) urging the client to perform operation after the telephone remote setting in S1100. A notification screen 1250 illustrated in FIG. 12B is a screen that gives a notification to the client. The notification screen 1250 includes a message unit 1253, which is a popup window. The message unit 1253 displays a message indicating that operation check is performed and a message indicating that fixing processing is performed after a problem has been solved. When a close button of the message unit 1253 is selected, a setting screen 1200 is displayed. The setting screen 1200 includes a fixing button 1201 and a cancel button 1202. Moreover, on the setting screen 1200, when a status button 905 is selected, the notification screen 1250 is displayed again.

Moreover, apart from the message unit 1253, notification starts also at a status display unit 1254. The status display unit 1254 includes an attention message indicating that the setting change by the telephone remote setting is temporary. The status display unit 1254 is an area in which display continues even after screen transition to another function screen. Therefore, an attention can be called even after the client closes the telephone remote setting screen 1200. Moreover, when the status display unit 1254 is selected, the setting screen 1200 is displayed. Therefore, the client can cause screen transition to the setting screen 1200 from any of the screens including the status display unit 1254. Note that on the setting screen 1200, when the fixing button 1201 or the cancel button 1202 is selected, a notification using the status display unit 1254 is canceled.

In S1101, the client becomes aware of the fact that the telephone remote setting has been completed by watching the screen of the MFP 102. Although not illustrated, for example, in cases where the screen is not monitored by the client, the client becomes aware of completion of the telephone remote setting upon reception of a phone call from the service engineer.

In order to perform operation check, the client who is aware of completion of the telephone remote setting closes the setting screen 1200, selects the FAX function from a menu screen (not illustrated), and causes a FAX screen 1300 illustrated in FIG. 13 to be displayed (S1102). Then, the client performs test transmission or the like, receives confirmation of results from the transmission destination, and ends the operation check.

Here, when the failure has been solved, the client selects the status display unit 1254 to open the setting screen 1200. Then, the client presses the fixing button 1201. When the fixing button 1201 is pressed, the change is saved on the service setting value DB 304 non-temporarily. When the failure has not been solved, the cancel button 1202 is pressed. In this case, the temporarily saved change setting value is overwritten with the original value saved on the service setting value DB 304.

When the fixing button is pressed in S1103, the MFP 102 automatically makes a call (outgoing call) to the telephone 101 of the service engineer (S1104). There are several conceivable methods regarding a method for the MFP 102 to preliminarily obtain the telephone number of the telephone 101 of the service engineer. The telephone number may be obtained from a number display notification when the first incoming call is received in S204 of FIG. 2, or although not illustrated, the telephone number may also be told by dialing after input of PIN code in S205 and S206.

In S1105, the service engineer responds to the phone call from the MFP 102 on the telephone 101, and the MFP 102 sends guidance indicating that the fixing button 1201 has been pressed, to the line 103 (S1106). The service engineer listens to the guidance and, when recognizing that the setting is valid, disconnects the line on the telephone 101 (S1107). Note that when the cancel button is selected, the MFP 102 may make a phone call to the telephone 101 to notify the service engineer of the message indicating cancel.

Figure 20A:
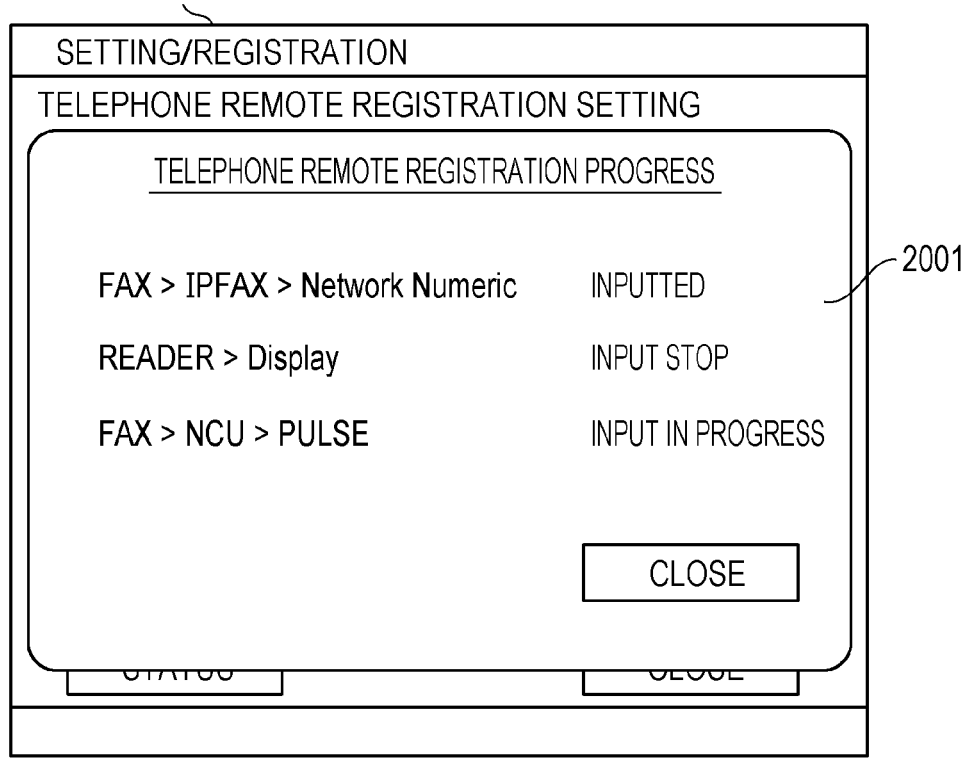
FIG. 20A is a view illustrating a progress screen of telephone remote setting.

Note that, although not described in FIG. 11, the progress status of the telephone remote setting by the service engineer may be displayed on the display 407. FIG. 20A is a view illustrating a progress screen of telephone remote setting. A progress screen 2000 illustrated in FIG. 20A is a screen displaying the progress status of the telephone remote setting. FIG. 20A illustrates that a setting regarding FAX>IPFAX>NETWORK NUMERIC is completed, a setting regarding READER>DISPLAY is stopped, and input of setting of FAX>NCU>PULSE is in progress.

The progress screen 2000 can be displayed when the status button 905 is selected during the telephone remote setting by the service engineer. Thus, when the operation situation of the telephone remote setting can be confirmed, it is possible to monitor whether a setting item not intended by the client has been changed. Note that information displayed on the progress screen 2000 may be detailed information including the switch name of the setting item or may only be general items including "COPY", "READER", FAX", and "FINISHER".

<Processing Flow of MFP 102 During Telephone Remote Setting>

Figures 14, 14A, 14B:
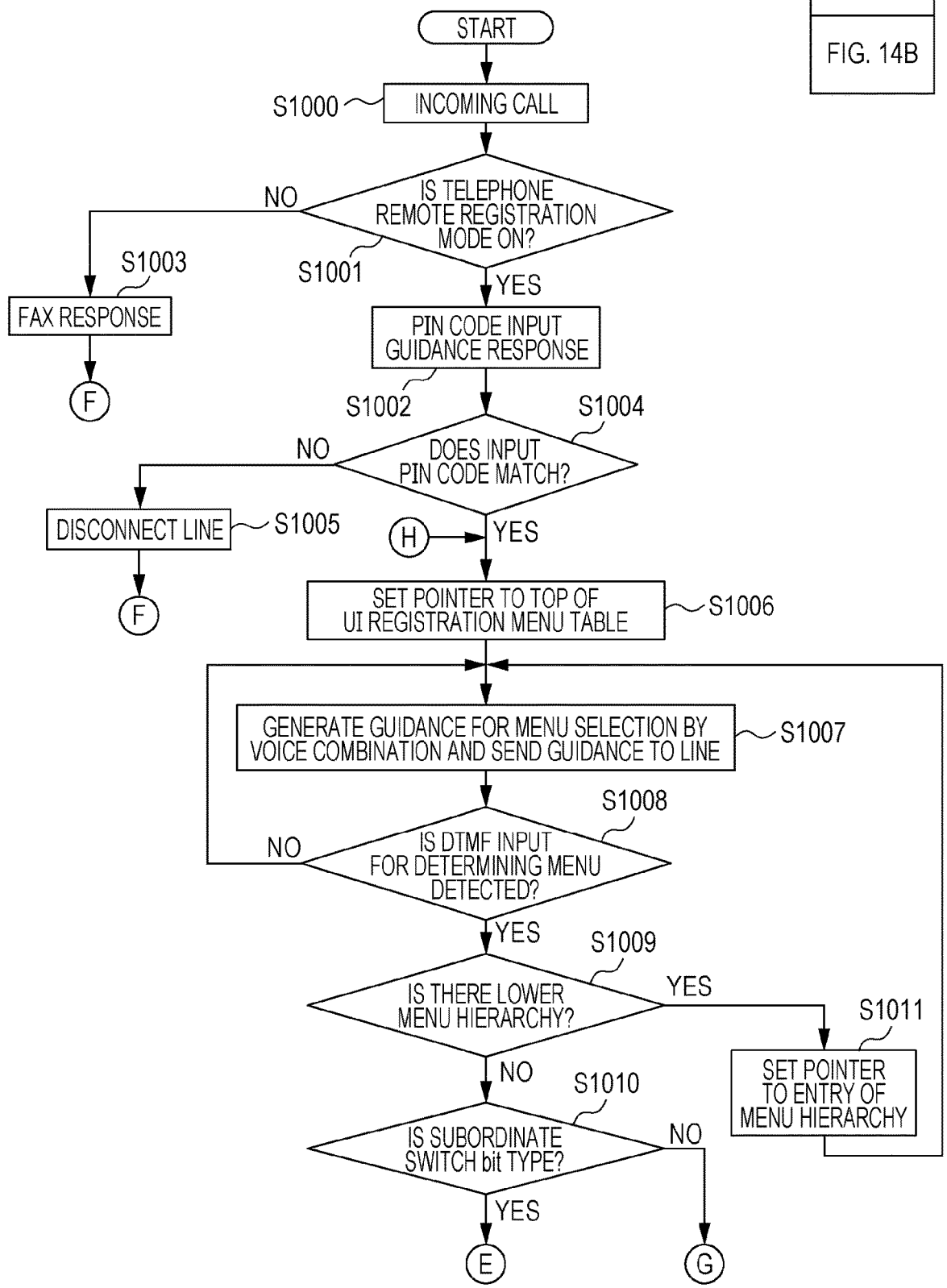
FIGS. 14A and 14B are diagrams illustrating a flow in the case of telephone remote setting of Example 2.
Figure 14B:
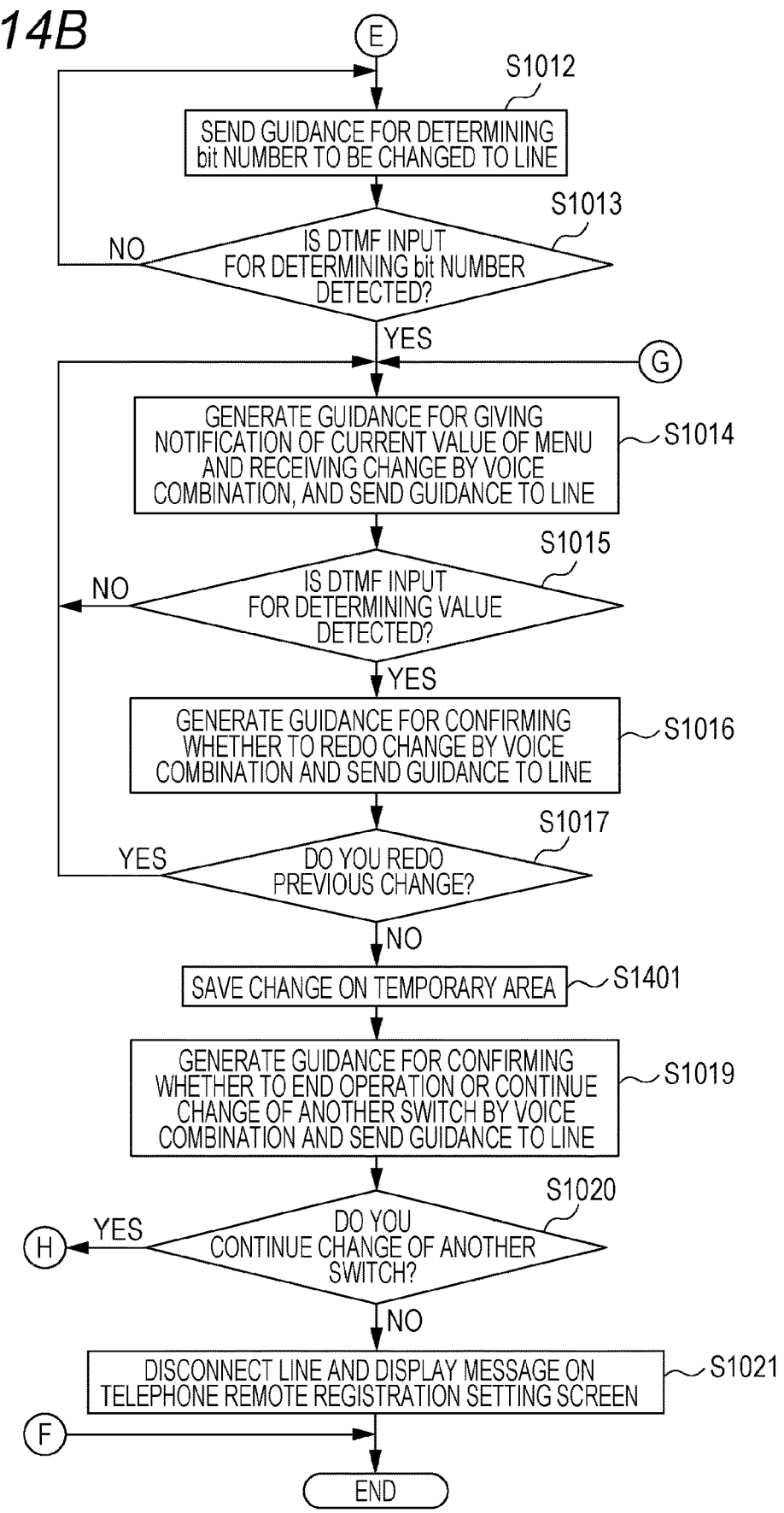
Figure 15:
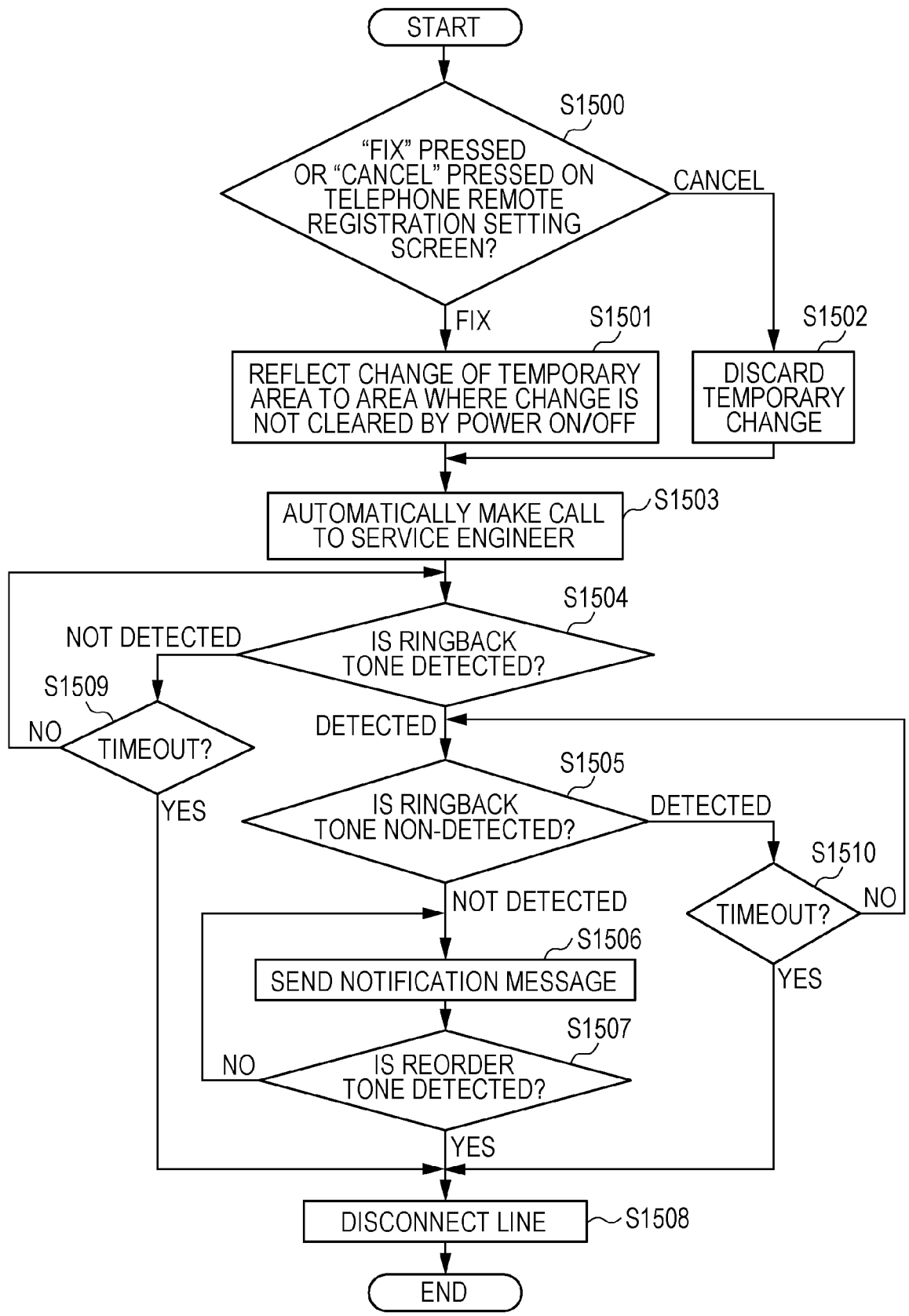
FIG. 15 is a diagram illustrating a flow in the case of fixing telephone remote setting of Example 2.

Next, a description is given of a processing flow of the MFP 102 of the telephone remote setting of Example 2 in conjunction with FIGS. 14 and 15. Note that this series of processing is performed when a program describing a procedure described below so as to be executable by the MFP 102 is read onto the RAM 403 from the ROM 402 and then the program is executed by the CPU 401. FIGS. 14A and 14B are diagrams illustrating a flow in the case of telephone remote setting of Example 2. FIG. 15 is a diagram illustrating a flow in the case of fixing telephone remote setting of Example 2.

FIGS. 14A and 14B differ from FIGS. 10A and 10B, which is the flowchart of Example 1, only in terms of S1500. Therefore, a description is only given of S1500. The other steps are the same as those described in FIGS. 10A and 10B.

When selection is made not to redo the change in S1017, the step proceeds to S1500. The value after the change detected in S1015 is saved only on the temporary setting value DB 310 of FIG. 3. At this time, the value is not yet saved on the service setting value DB 304. Thus, when the operation check of the FAX is performed in this state, the FAX communication control unit 309 performs communication control by using the value of the temporary setting value DB 310. Therefore, confirmation using the value after the change can be performed. Moreover, because the changed value is only reflected to the temporary area, the value is in a state where it can be readily returned to the original.

Next, a description is given of the processing flow of the MFP 102 after the completion of the processing of S1021 of FIGS. 14A and 14B in conjunction with FIG. 15. First, in S1500, when the pressing of the fixing button 1201 on the telephone remote setting screen 1200 is detected, the step proceeds to S1501. Then, the value saved on the temporary setting value DB 310 in S1500 is saved on the service setting value DB 304 where the value is not cleared even when the power is turned ON/OFF. Next, in order to tell the service engineer the fact that the fixing button 1201 has been pressed, the telephone remote setting control unit 307 tells the telephone number of the telephone 101 to the line control unit 311. Then, the MODEM 415 is controlled via the modem control unit 313, and dialing is automatically performed with respect to the line 103 (S1503).

Next, in S1504, a tone detection function of the MODEM 415 is used to detect a ringback tone sent from the line 103 when dialing is made. When the ringback tone is detected, the step proceeds to S1505. Then, processing to determine whether the other end (telephone 101) has answered the phone is performed. When the other end (telephone 101) answers the phone, the ringback tone is stopped. Therefore, ringback tone non-detection determination is performed in S1505. When the ringback tone is stopped and not detected, the step proceeds to S1506. The telephone remote setting control unit 307 hands over the text "fixing button has been pressed" to the voice combination section 305, and PCM data of voice guidance is generated. The generated PCM data is sent to the MODEM 415 via the line control unit 311 and the modem control unit 313 of the FAX communication control unit 309 and is sent to the line 103 using the PCM output function of the MODEM 415.

Then, the step proceeds to S1507. In order to determine whether the other end (telephone 101) has disconnected the line, a tone detection function of the MODEM 415 is used to perform reorder tone detection processing. The reorder tone is a tone signal sent from the line 103 when the other end (telephone 101) has disconnected the line first. When the reorder tone is detected, the step proceeds to S1508. The line is disconnected using the MODEM 415 and the processing ends. When the reorder tone is not detected in S1507, the step returns to S1506, and message sending is repeated. Although not illustrated, the number of times of message sending in S1506 may have a higher limit. In this case, when the higher limit is reached, even when the reorder tone is not detected, the step proceeds to the line disconnection of S1508.

Note that when the ringback tone is not detected by the MODEM 415 in S1504, timeout determination is performed in S1509. When a non-detection state continues for a certain period of time, the step proceeds to the line disconnection processing of S1508. Similarly, when the ringback tone is continuously detected by the MODEM 415 in S1505, timeout determination is performed in S1510. When a non-detection state continues for a certain period of time, the step proceeds to the line disconnection processing of S1508.

In S1500, which is the first step, when pressing of the cancel button 1202 is detected, in order to clear the change saved on the temporary setting value DB 310, the data is overwritten and updated to the temporary setting value DB 310 from the service setting value DB 304. Note that, when the cancel button 1202 is pressed, the voice guidance sent to the line 103 in S1506 is "cancel button has been pressed".

By the processing flow described above, after the setting value is changed by remote setting with a phone, it is possible to fix the setting after the client checks the effect. If the effect cannot be confirmed, the setting can be returned to the original just by pressing of the cancel button. Moreover, pressing the fixing or cancel button automatically makes a phone call to the service engineer and sends guidance. Therefore, it is possible to automatically tell the situation to the service engineer.

Example 3

In Example 1, a description has been given of the telephone remote setting of changing the setting value by descending the menu hierarchy according to the voice guidance. Incidentally, when the menu hierarchy of the setting value to be set by the telephone remote setting is deep, there is a problem that time is taken to select a menu by dial operation on the telephone 101. In order to solve this problem, a description is given of the present example regarding a method for shortening the time such that the clients presets the position of a menu for which voice guidance starts. Note that the configuration of Example 3 is the same as the basic configuration described in Example 1 except for the aforementioned characterizing part. Therefore, the same configurations as those of Example 1 are designated by the same reference symbols and numerals and will not be elaborated.

Figures 16, 17:
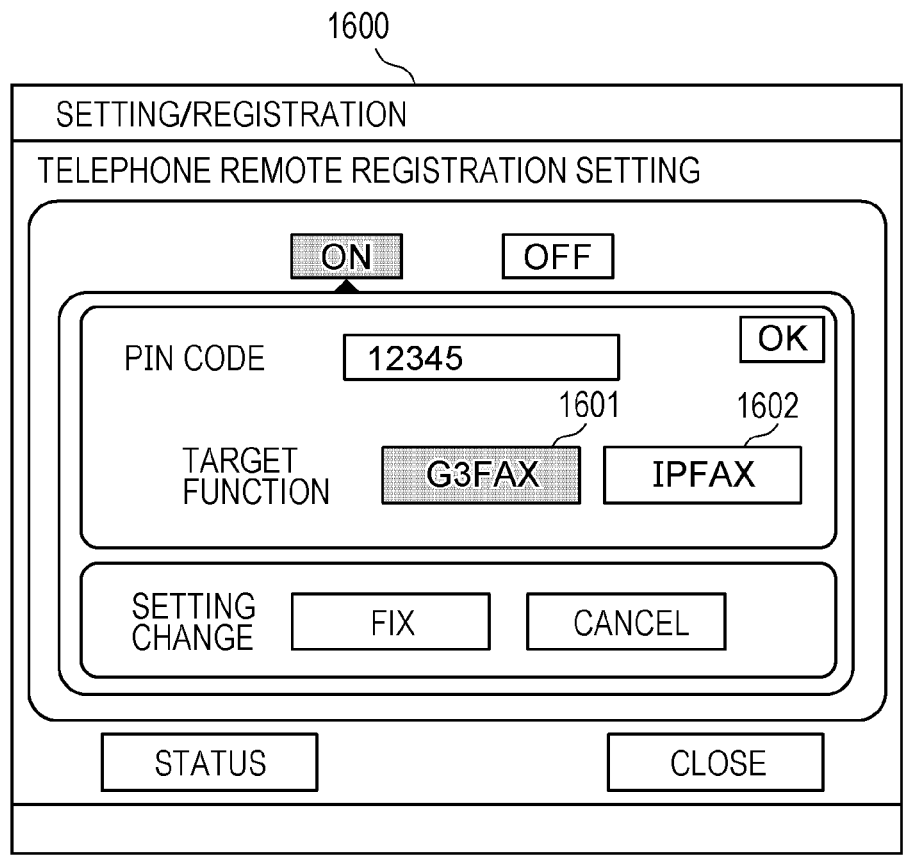
FIG. 16 is a view illustrating a setting screen of telephone remote setting of Example 3.
FIG. 17 is a diagram illustrating a correspondence between a target function and a menu start position of telephone remote setting of Example 3.

FIG. 16 is a view illustrating a setting screen of telephone remote setting of Example 3. A setting screen 1600 of FIG. 16 additionally includes a button for selecting a target function as compared with the drawings of the other examples. The setting screen 1600 displays that two target functions: G3FAX 1601 and IPFAX 1602 are selectable. However, this is a mere example, and other functions may be selectable. When the OK button 904 is pressed, selection information of the target function is saved on the user setting value DB 303.

<Correspondence Between Target Function and Start Menu Position of Voice Guidance>

Figure 18B:
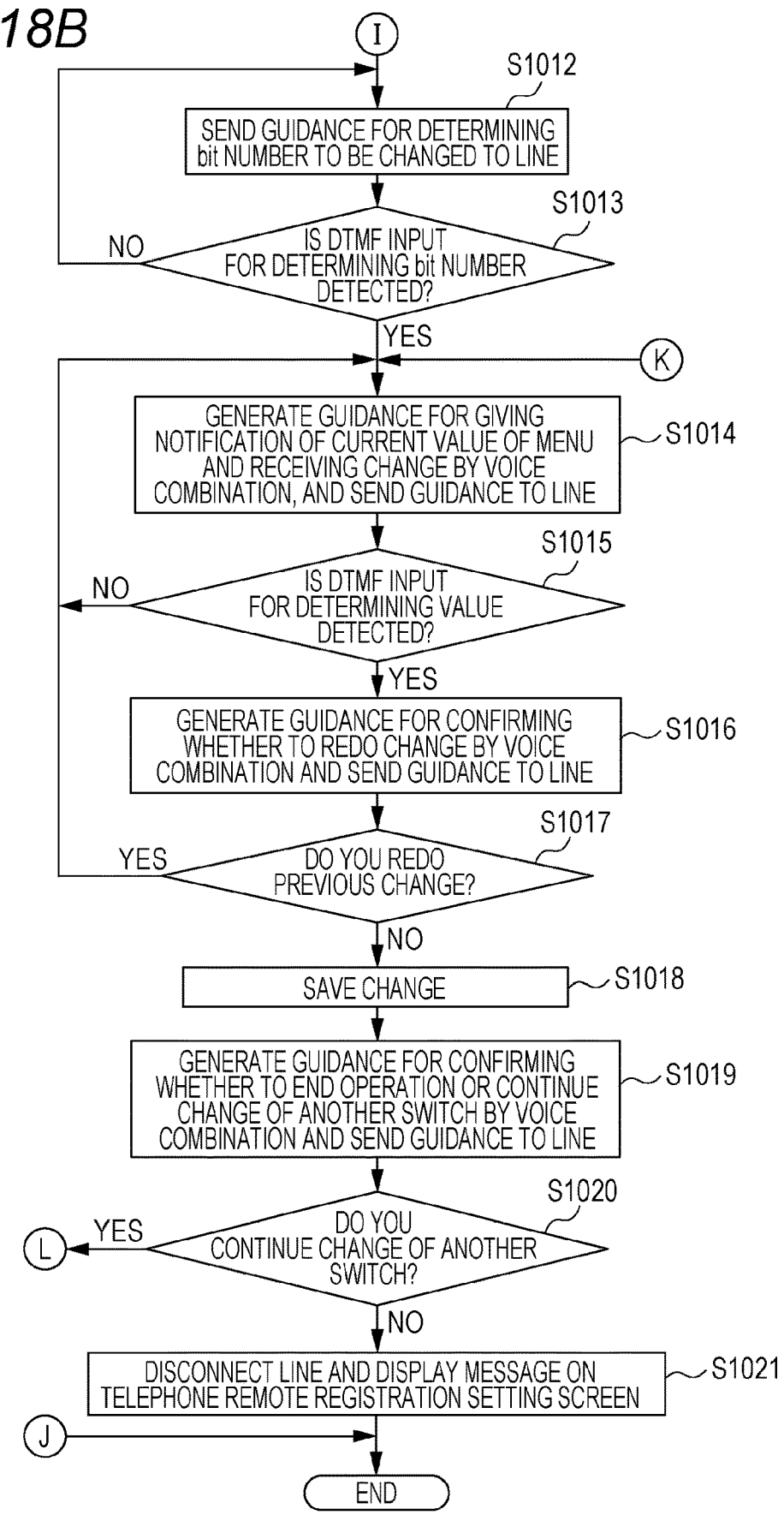

Next, a description is given of how to change the start position of voice guidance by the target function selected in FIG. 16 described above in conjunction with FIGS. 17 and 18. FIG. 17 is a view illustrating a correspondence between the target function and the menu start position of telephone remote setting of Example 3. FIGS. 18A and 18B depict a flowchart in the case of performing the telephone remote setting of Example 3. Note that the flowchart of FIGS. 18A and 18B differs from that of Example 1 only in terms of step S1800. Therefore, only this step is described. The other steps are the same as those described in FIGS. 14A and 14B of Example 1.

FIG. 17 illustrates a correspondence between a target function and the start position of a menu hierarchy for which guidance by means of voice guidance starts. This correspondence information is saved on the ROM 402. An item column 1700 is an entry area of a target function where all items that can be selected by the target function of FIG. 16 are present. An item column 1701 is information of a menu start position corresponding to the item column 1700. In this example of the drawing, when G3FAX is selected as the item column 1700, FAX (704 in FIGS. 7A to 7E) is selected as the menu start position. When the item column 1700 is IPFAX, IPFAX (710 in FIGS. 7A to 7E) is selected.

In S1800 of the flowchart of FIGS. 18A and 18B, the pointer indicating the start position of a registered menu is initialized. Here, a pointer is initialized according to a target function selected on the telephone remote setting screen 1600. As described above, when G3FAX is selected as the target function, a pointer is initialized at the FAX 704. When IPFAX is selected, a pointer is initialized at the IPFAX 710. Thus, when the start position does not always start with the top of the menu like in Example 1, but starts with the middle of the menu hierarchy depending on the target function, it is possible to reduce the number of times of voice guidance sent to the line in S1007.

Thus, in the present example, the content of guidance by means of voice guidance is determined by the user setting.

As described above, for example, when the client encounters a communication trouble of IPFAX, IPFAX is selected as the target function on the telephone remote setting screen 1600. Thus, the procedure for the service engineer to perform selection according to the voice guidance is reduced, and the time taken for the service engineer to perform setting can be shortened.

According to the present disclosure, it is possible to provide a communication apparatus including a remote setting function that is highly convenient for a user. In particular, it is possible to provide a communication apparatus in which a change of a setting content intended by a user is performed by voice guidance intended by the user.

Other Example

Note that the present disclosure is not limited to the aforementioned examples, but various modifications (including an organized combination of the examples) may be made on the basis of the gist of the present disclosure, and they are not excluded from the scope of the present disclosure. That is, configurations of combinations of the aforementioned examples and variation are all included in the present disclosure.

Figure 20B:
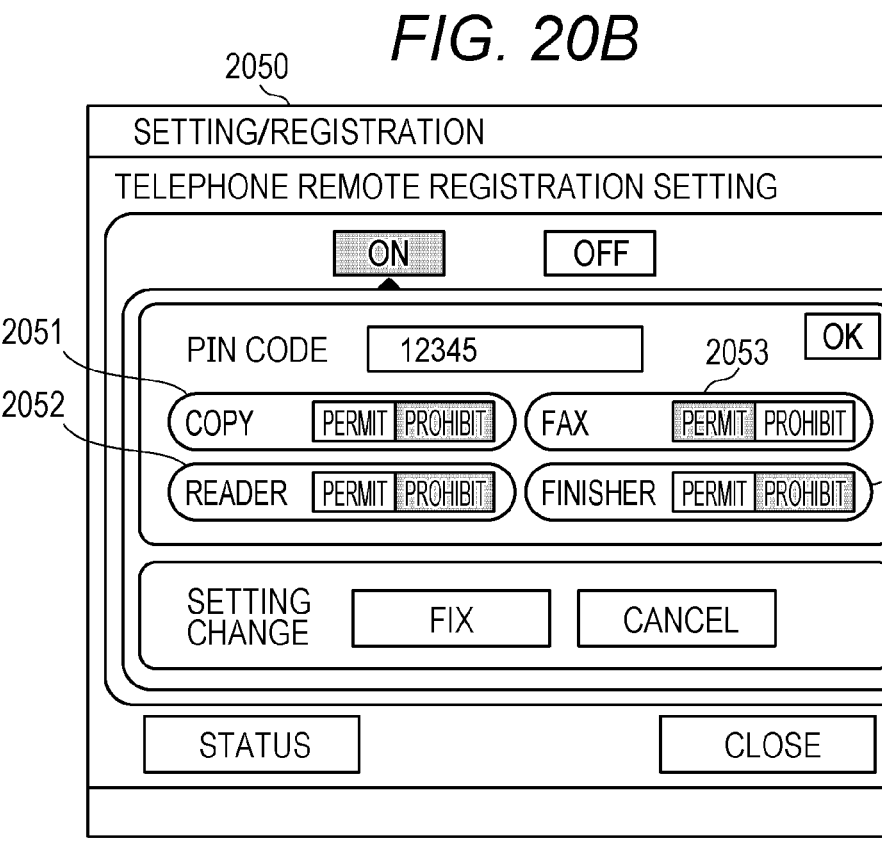
FIG. 20B is a view illustrating a setting screen of telephone remote setting of a variation.

In Example 2, a description has been given of the case where the progress screen 2000 is displayed to enable monitoring as to whether a setting item not intended by the client has been changed. However, other methods may be adopted to prevent a setting item not intended by the client from being changed. For example, as illustrated in FIG. 20B, a setting item that can be changed by the telephone remote setting may be specified by the client on a setting screen 2050. FIG. 20B is a view illustrating a setting screen of the telephone remote setting of a variation.

Unlike the setting screens of the other examples, the setting screen 2050 includes permission settings 2051, 2052, 2053, and 2054. The permission setting 2051 can specify permission or prohibition of a setting change of a copy function. The permission setting 2052 can specify permission or prohibition of a setting change of a read function. The permission setting 2053 can specify permission or prohibition of a setting change of a FAX function. The permission setting 2054 can specify permission or prohibition of a setting change of a post-processing function. The client selects a switch of permission or prohibition of a setting item and selects the OK button 904 such that the setting is saved.

FIG. 20B illustrates an example of settings in which a setting change regarding COPY is prohibited, a setting change regarding READER is prohibited, a setting change regarding FAX is permitted, and a setting change regarding FINISHER is prohibited. An item set to be prohibited on the setting screen 2050 is removed from the selection items by voice guidance, and guidance is provided only for an item set to be permitted. Therefore, an item set to be prohibited cannot be changed by the telephone remote setting. Thus, the guidance content of voice guidance is determined by the user setting.

Moreover, in the aforementioned example, a description has been given of the example in which DTMF input is used as an input method with voice phone call. However, as an input method with voice phone call, voice input that determines an input value from the voice of the service engineer may be used.

Moreover, the line used for voice communication is not limited to public network (PSTN). IP phone that performs voice communication via a network, e.g., LAN, may be utilized.

Moreover, a PIN code used for authentication of remote setting may not be input by the client. For example, it is sufficient if the MFP 102 randomly sets a PIN code and displays it on a screen when the remote registration setting is set to ON.

Then, when the client tells the service engineer the displayed PIN code, the service engineer can perform authentication using the PIN code.

Moreover, the method for notifying the service engineer of the fixation of setting change is not limited to automatic dialing. For example, a notification indicating that the fixing button has been pressed may be given to a cellular phone 101 by a text message using SMS (short message service).

The present disclosure can also be achieved by processing in which a program for achieving one or more functions of the aforementioned examples is supplied to a system or apparatus via network or a storage medium and one or more processors of a computer in the system or apparatus read and execute the program. Moreover, the program can also be achieved by a circuit (e.g., ASIC) that achieves one or more functions.

Moreover, the present disclosure may be applied to a system including a plurality of devices or an apparatus including a single device. For example, a function may be achieved such that part of the module described in the software 350 is configured to be executed by an external server and results processed by the external server are obtained. For example, a job storage unit that stores print data may be provided within the external server.

Note that the definitions of the abbreviations shown in the examples are as follows: ASIC means Application Specific Integrated Circuit. CPU means Central Processing Unit. FAX means FACSIMILE. LAN means Local Area Network. MFP means Multi Function Peripheral. RAM means Random-Access Memory. ROM means Read Only Memory. UI means User Interface. IF means Interface.

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-170080, filed Sep. 11, 2018, which is hereby incorporated by reference herein in its entirety.

What is claimed is:

1. A communication apparatus comprising:
a display configured to display information;
at least one controller configured to:
cause the display to display a PIN code set in the communication apparatus; and
output a guidance voice regarding a remote setting change using a tone signal to an external apparatus via voice communication depending on reception of a tone signal corresponding to the PIN code from the external apparatus via voice communication.

2. The communication apparatus according to claim 1, further comprising a reception device configured to receive operation of a user;
wherein,
the at least one controller is further configured to
receive input via the reception device; and
determine a step of starting guidance from among a plurality of steps regarding the remote setting change based on the input and output a guidance voice of the determined step to the external apparatus via voice communication.

3. The communication apparatus according to claim 2, wherein
the at least one controller is further configured to
cause the display to display a screen for performing the input.

4. The communication apparatus according to claim 1, further comprising a reception device configured to receive operation of a user;
wherein,
the at least one controller is further configured to
receive input via the reception device;
output a guidance voice of some response candidate of a plurality of response candidates to the external apparatus via voice communication based on the input in a step capable of presenting the plurality of response candidates using a tone signal among steps regarding the remote setting change.

5. The communication apparatus according to claim 4, wherein
the at least one controller is further configured to
cause the display to display a screen for performing the input.

6. The communication apparatus according to claim 1, wherein
the at least one controller is further configured to
call the external apparatus according to reception of an instruction for fixing setting input by the remote setting change.

7. The communication apparatus according to claim 1, wherein
the at least one controller is further configured to
cause the display to display a screen for fixing use of a setting value input by the remote setting change.

8. The communication apparatus according to claim 1, wherein
the at least one controller is further configured to
cause the display to display a screen for giving a notification of a state of the remote setting change.

9. The communication apparatus according to claim 1, wherein
the at least one controller is further configured to
cause the display to display a screen for setting whether to start the voice communication according to an incoming call.

10. The communication apparatus according to claim 1, wherein
the at least one controller is further configured to
cause the display to display a message indicating that the remote setting change has been performed.

11. The communication apparatus according to claim 1, wherein
the at least one controller is further configured to
cause the display to display a screen capable of specifying the PIN code.

12. The communication apparatus according to claim 1, wherein
the guidance voice is generated at least based on a setting value set to at least one setting item among a plurality of setting items whose setting is changeable by the remote setting change.

13. The communication apparatus according to claim 1, wherein
the guidance voice is generated at least based on a pre-registered character string.

14. The communication apparatus according to claim 1, wherein
the tone signal is a Dual-Tone Multi-Frequency.

15. The communication apparatus according to claim 1, wherein
a setting item that can be changed by the remote setting change is a setting item related to a FAX function.

16. The communication apparatus according to claim 1, wherein
a setting item that can be changed by the remote setting change is a setting item related to a copy function.

17. The communication apparatus according to claim 1, wherein a setting item that can be changed by the remote setting change is a setting item related to a read function.

18. The communication apparatus according to claim 1, wherein
a setting item that can be changed by the remote setting change is a setting item related to a post-processing function.

19. A method for controlling a communication apparatus with a display for displaying information, comprising:
causing the display to display a PIN code set in the communication apparatus; and
outputting a guidance voice regarding a remote setting change using a tone signal to an external apparatus via voice communication depending on reception of a tone signal corresponding to the PIN code from the external apparatus via voice communication.

20. A non-transitory storage medium storing a program causing a computer to execute a method for controlling a communication apparatus with a display for displaying information, the control method comprising:
causing the display to display a PIN code set in the communication apparatus; and
outputting a guidance voice regarding a remote setting change using a tone signal to an external apparatus via voice communication depending on reception of a tone signal corresponding to the PIN code from the external apparatus via voice communication.

* * * * *